(12) United States Patent
Tung et al.

(10) Patent No.: US 10,940,438 B2
(45) Date of Patent: Mar. 9, 2021

(54) OMNIPHOBIC MEMBRANES AND APPLICATION THEREOF

(71) Applicant: National Taiwan University, Taipei (TW)

(72) Inventors: Kuo-Lun Tung, Taipei (TW); Allen Huang, Taipei (TW); Liang-Hsun Chen, Taipei (TW); Yi-Rui Chen, Taipei (TW); Chien-Hua Chen, Taipei (TW); Che-Chen Hsu, Taipei (TW); Feng-Yu Tsai, Taipei (TW)

(73) Assignee: NATIONAL TAIWAN UNIVERSITY, Taipei (TW)

(*) Notice: Subject to any disclaimer, the term of this patent is extended or adjusted under 35 U.S.C. 154(b) by 230 days.

(21) Appl. No.: 16/193,326

(22) Filed: Nov. 16, 2018

(65) Prior Publication Data

US 2020/0156006 A1 May 21, 2020

(51) Int. Cl.
| | | |
|---|---|---|
| *B01D 61/36* | (2006.01) | |
| *B01D 61/14* | (2006.01) | |
| *B01D 69/10* | (2006.01) | |
| *B01D 69/12* | (2006.01) | |
| *B01D 71/02* | (2006.01) | |

(Continued)

(52) U.S. Cl.
CPC ......... *B01D 61/364* (2013.01); *B01D 61/147* (2013.01); *B01D 67/0079* (2013.01); *B01D 67/0088* (2013.01); *B01D 69/10* (2013.01); *B01D 69/12* (2013.01); *B01D 71/021* (2013.01); *B01D 71/022* (2013.01); *B01D 71/024* (2013.01); *B01D 71/34* (2013.01); *C02F 1/447* (2013.01); *C02F 2103/08* (2013.01)

(58) Field of Classification Search
CPC ............... B01D 61/147; B01D 61/364; B01D 67/0079; B01D 69/02; B01D 69/10; B01D 71/024; B01D 71/32; B01D 71/34; C02F 1/447
See application file for complete search history.

(56) References Cited

U.S. PATENT DOCUMENTS

| | | | |
|---|---|---|---|
| 8,263,410 B2* | 9/2012 | Kang | G01N 21/554 |
| | | | 436/73 |
| 2018/0040904 A1* | 2/2018 | Choi | C08J 5/2225 |

(Continued)

FOREIGN PATENT DOCUMENTS

EP 2253372 A1 * 11/2010 ............. B01D 71/70

OTHER PUBLICATIONS

Liang-Hsun Chen et al., "Omniphobic membranes for direct contact membrane distillation: Effective deposition of zinc oxide nanoparticles" Desalination, vol. 428, 2018, pp. 255-263, ISSN 0011-9164.

Primary Examiner — Ana M Fortuna
(74) Attorney, Agent, or Firm — WPAT, PC

(57) ABSTRACT

The present invention provides an omniphobic membrane and application thereof. The omniphobic membrane comprises a porous substrate which has a pore size between 0.4 and 2 μm, a top coat, and an interface layer between the porous substrate and the top coat, and the omniphobic membrane has a carbon/silicon ratio between 40 and 60, and a hierarchical re-entrant structure. Furthermore, both of a process for fabricating the omniphobic membrane and a method for desalination of a liquid by membrane distillation are provided in the present invention.

19 Claims, 25 Drawing Sheets

(51) Int. Cl.
*B01D 71/34* (2006.01)
*B01D 67/00* (2006.01)
*C02F 1/44* (2006.01)
*C02F 103/08* (2006.01)

(56) References Cited

U.S. PATENT DOCUMENTS

2019/0070330 A1* 3/2019 Parrinello .................. A61L 9/12
2020/0368778 A1* 11/2020 Wang ........................ B05D 5/08
2020/0397967 A1* 12/2020 Roy ........................ B01D 69/12

* cited by examiner

OMNIPHOBIC MEMBRANES AND APPLICATION THEREOF

TECHNICAL FIELD OF THE INVENTION

The present invention relates to omniphobic membranes and their use for membrane distillation. In particular, the omniphobic membranes comprise zinc oxide nanoparticles.

BACKGROUND OF THE INVENTION

Membrane distillation (MD) is a thermally driven process that has been considered a promising alternative to conventional separation technologies, such as reverse osmosis (RO) and distillation. In a MD process in which a hydrophobic porous membrane acts as a barrier to create a liquid-vapor interface at the entrance of the membrane pores. The temperature difference across the membrane induces a vapor pressure difference that drives water molecules from the feed to the permeate in the form of vapor. MD can be not only operated at mild pressure and temperature, but also partially powered by alternative energy sources, such as solar energy, waste heat and geothermal energy.

MD has been widely applied in the desalination of high salinity waters to address the issues of water scarcity. However, conventional hydrophobic membranes are limited to the treatment of relatively clean water sources that have minimal surface-active agents. The low surface tension contaminants that exist in wastewater streams lead to potential wetting of the membrane pores. The wetted membrane pores undermine the function of the membrane as an effective barrier for creating a liquid-vapor interface for fluid streams, and the practical MD applications are thus restricted. The failure to treat low surface tension wastewaters results in the loss of valuable clean water sources.

Based on the aforementioned description, the development of robust membranes is imperative for extending membrane applications to the desalination of challenging wastewaters, especially high salinity wastewaters from major industries, such as the textile, chemical, shale gas and petroleum industries.

SUMMARY OF THE INVENTION

In one aspect, the present invention provides an omniphobic membrane, which comprises a porous substrate which has a pore size between 0.4 and 2 μm, a top coat, and an interface layer between the porous substrate and the top coat, wherein the omniphobic membrane has a carbon/silicon ratio between 40 and 60, and a hierarchical re-entrant structure.

The invented omniphobic membrane possessed a specific morphology and an extremely high fluorine concentration on the surface. The omniphobicity of the omniphobic membrane was indicated by the contact angles for water and ethanol, which were as high as 152.8±1.1° and 110.3±1.9°, respectively. Compared to superhydrophobic membranes without deposited ZnO nanoparticles, the invented omniphobic membrane revealed a higher wetting resistance to low surface tension feed solutions during direct membrane distillation (DCMD) experiments, and the initial water flux was maintained after the addition of 0.3 mM sodium dodecyl sulfate to a 60° C. 1 M NaCl solution. The results show that the invented omniphobic membrane exhibited not only superior wetting resistance to low surface tension liquids but also promise for desalinating low surface tension wastewaters.

In another aspect, the present invention discloses a process for fabricating an omniphobic membrane. The process comprises steps as follows. (1) Deposit a metal oxide on a porous substrate which has a pore size between 0.4 and 2 μm by a chemical bath deposition method; (2) Coat a film on the metal oxide to form an organic-inorganic hybrid layer on the porous substrate; and (3) Coat a polymer onto the organic-inorganic hybrid layer on the porous substrate to form the omniphobic membrane, wherein the omniphobic membrane has a carbon/silicon ratio between 40 and 60, and a hierarchical re-entrant structure.

Typically, the invented omniphobic membrane was fabricated for membrane distillation (MD) by effectively depositing ZnO nanoparticles on a hydrophilic glass fiber (GF) substrate or membrane using a chemical bath deposition method to create hierarchical re-entrant structures, followed by surface fluorination and the addition of a polymer coating to lower the surface energy of the membrane.

In still another aspect, the present invention provides a method for desalination of a liquid by membrane distillation. The method comprises steps of following: provide a separation module comprises a plurality of omniphobic membrane; feed a liquid into the separation module; and perform membrane distillation to have the liquid pass through the plurality of omniphobic membrane to desalinate the liquid. The omniphobic membrane comprises a porous substrate which has a pore size between 0.4 and 2 μm, a top coat, and an interface layer between the porous substrate and the top coat, wherein the interface layer comprises a film and metal oxides which of the diameter is between 200 and 400 nm, and the metal oxides are deposited on the porous substrate and covered by the film.

The invented omniphobic membrane used for membrane distillation (MD) has a carbon/silicon ratio between 40 and 60, a hierarchical re-entrant structure, and a salt rejection rate more than 90%.

The direct contact membrane distillation (DCMD) experiments demonstrate that the invented omniphobic membrane possessed the highest wetting resistance to the low surface tension feed solution, and the initial water flux was maintained after the addition of 0.3 mM SDS to the feed, which corresponded to a solution surface tension of approximately 31 mN/m. The above results show that the invented omniphobic membrane is excellent for desalination of a liquid by membrane distillation. In particular, the invented omniphobic membrane is promising and feasible for desalinating low surface tension wastewaters.

In accordance with the present invention, the invented omniphobic membrane was fabricated for membrane distillation (MD) by effectively depositing ZnO nanoparticles on a hydrophilic glass fiber (GF) substrate or membrane using a chemical bath deposition method to create hierarchical re-entrant structures, followed by surface fluorination and the addition of a polymer coating to lower the surface energy of the membrane. The omniphobic membranes possessed a particulate membrane morphology and an extremely high fluorine concentration on the surface. The omniphobicity of the invented omniphobic membrane was indicated by the contact angles for water and ethanol, which were as high as 152.8±1.1° and 110.3±1.9°, respectively. Compared to superhydrophobic GF membranes without deposited ZnO nanoparticles, the omniphobic membrane revealed a higher wetting resistance to low surface tension feed solutions during direct membrane distillation (DCMD) experiments, and the initial water flux was maintained after the addition of 0.3 mM sodium dodecyl sulfate to a 60° C. 1 M NaCl solution. The results suggest that the omniphobic membrane exhibited not only superior wetting resistance to low surface tension liquids but also promise for desalinating low surface tension wastewaters.

BRIEF DESCRIPTION OF THE DRAWINGS

FIG. 3 includes SEM images of the membranes disclosed in the invention; where

FIG. 7 includes plots of water flux and salt rejection of the membranes disclosed in the invention; where FIG. 8 illustrates schematic diagrams of the hydrophobic membrane contactors: where

BRIEF DESCRIPTION OF THE PREFERRED EMBODIMENTS

Figure 1:
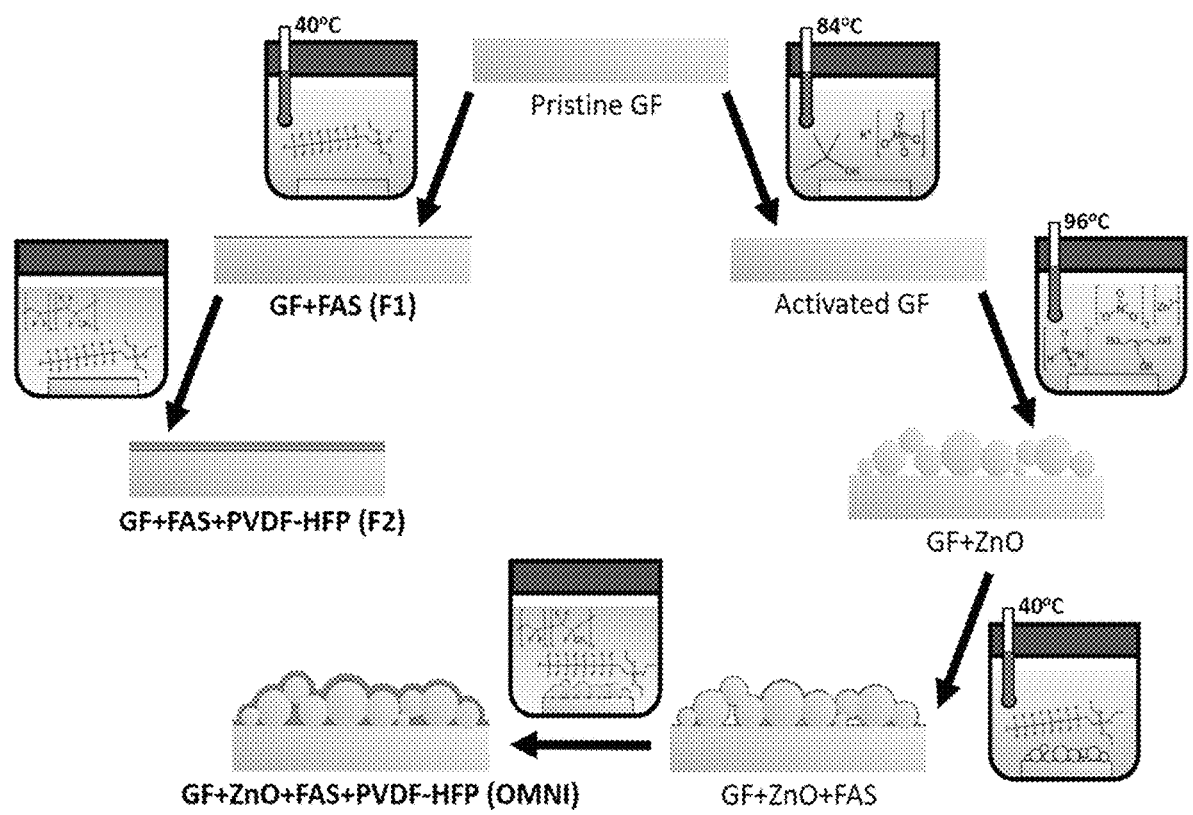
FIG. 1 illustrates preparation procedures for the GF membrane modified by FAS17 (F1), the GF membrane modified by FAS17 and the polymer coating (F2), and the GF membrane with ZnO nanoparticles modified by FAS17 and the polymer coating (OMNI)

In one embodiment, the present invention discloses an omniphobic membrane. The omniphobic membrane comprises a porous substrate which has a pore size between 0.4 and 2 μm, a top coat, and an interface layer between the porous substrate and the top coat, and the omniphobic membrane has a carbon/silicon ratio between 40 and 60, and a hierarchical re-entrant structure.

In one example of this embodiment, the porous substrate comprises glass fiber.

In one example of this embodiment, the interface layer comprises a film and metal oxides, and wherein the metal oxides are deposited on the porous substrate and covered by the film.

In one example of this embodiment, the top coat is a polymer which comprises Poly(vinylidene fluoride-co-hexafluoropropylene) (PVDF-HFP),Polytetrafluoroethylene (PTFE) or Poly(vinylidene fluoride) (PVDF). Preferably, the polymer is Poly(vinylidene fluoride-co-hexafluoropropylene) (PVDF-HFP).

In one example of this embodiment, the film is made of one which comprises 1H,1H,2H,2H-Perfluorodecyltriethoxysilane (FAS17) or polyhedral oligomeric silsesquioxane (POSS). Preferably, the film is made of 1H,1H,2H,2H-Perfluorodecyltriethoxysilane (FAS17).

In one example of this embodiment, the metal oxides comprise zinc oxide. Preferably, a size of the metal oxides is between 200 and 400 nm.

In one example of this embodiment, the omniphobic membrane is a part of distillation equipment with salt rejection rate more than 94%, a part of air gap membrane distillation equipment or a part of sweeping gap membrane distillation equipment.

In a second embodiment, the present invention discloses a process for fabricating an omniphobic membrane. The process comprises steps of (1) Deposit a metal oxide on a porous substrate which has a pore size between 0.4 and 2 μm by a chemical bath deposition method; (2) Coat a film on the metal oxide to form an organic-inorganic hybrid layer on the porous substrate; and (3) Coat a polymer onto the organic-inorganic hybrid layer on the porous substrate to form the omniphobic membrane, wherein the omniphobic membrane has a carbon/silicon ratio between 40 and 60, and a hierarchical re-entrant structure.

In one example of the second embodiment, the porous substrate comprises glass fiber.

In one example of the second embodiment, the top coat is a polymer which comprises Poly(vinylidene fluoride-co-hexafluoropropylene) (PVDF-HFP), Polytetrafluoroethylene (PTFE) or Poly(vinylidene fluoride) (PVDF).

In one example of the second embodiment, the film is made of one which comprises 1H,1H,2H,2H-Perfluorodecyltriethoxysilane (FAS17) or polyhedral oligomeric silsesquioxane (POSS).

In one example of the second embodiment, the metal oxide comprises zinc oxide. Preferably, a size of the zinc oxide is between 200 and 400 nm.

In a third embodiment, the present invention provides a method for desalination of a liquid by membrane distillation. The method comprises steps of: provide a separation module comprises a plurality of omniphobic membrane; feed a liquid into the separation module; and perform membrane distillation to have the liquid pass through the plurality of omniphobic membrane to desalinate the liquid, wherein the omniphobic membrane comprises a porous substrate which has a pore size between 0.4 and 2 μm, a top coat, and an interface layer between the porous substrate and the top coat. In detail, the interface layer comprises a film and metal oxides which of the diameter is between 200 and 400 nm. Furthermore, the metal oxides deposited on the porous substrate and covered by the film.

In particular, the omniphobic membrane has a carbon/silicon ratio between 40 and 60, a hierarchical re-entrant structure, and a salt rejection rate more than 90%.

In one example of the third embodiment, the liquid comprises seawater, an alkaline halide aqueous solution and an aqueous solution has a surface tension more than 30 mN/m.

In one example of the third embodiment, the porous substrate comprises glass fiber.

In one example of the third embodiment, the top coat is a polymer which comprises Poly(vinylidene fluoride-co-hexafluoropropylene) (PVDF-HFP), Polytetrafluoroethylene (PTFE) or Poly(vinylidene fluoride) (PVDF).

In one example of the third embodiment, the film is made of one which comprises 1H,1H,2H,2H-Perfluorodecyltriethoxysilane (FAS17) or polyhedral oligomeric silsesquioxane (POSS).

In one example of the third embodiment, the metal oxides comprise zinc oxide.

In the aforementioned embodiments, the carbon/silicon (C/Si) ratio of the invented omniphobic membrane is critical. When the omniphobic membrane has a specific carbon/silicon (C/Si) ratio between 40 and 60, it show the omniphobic membrane has the highest specific surface area.

The atomic percentage of various membranes' surfaces is list in TABLE 1, where the values are determined by XPS analysis.

TABLE 1

| Atomic (%) | Si 2p | O 1s | Zn 2p | C 1s | F 1s | F/C ratio | C/Si ratio |
|---|---|---|---|---|---|---|---|
| Pristine membrane | 10.9 | 36.9 | 0 | 52 | 0 | 0 | 4.77 |
| F1 membrane | 5 | 51 | 0 | 30.5 | 12.2 | 0.40 | 6.1 |
| F2 membrane | 8.3 | 19 | 0 | 39 | 32 | 0.84 | 4.53 |
| The invented omniphobic membrane | 1 | 11 | 1.8 | 45 | 41 | 0.91 | 45 |

Firstly, surface elemental analysis were conducted for three modified membranes with FAS 17(Herein refers to F1 membrane) and PVDF-HFP/FAS 17(Herein refers to F2 membrane) and the pristine membrane by using X-ray photoelectron spectroscopy scan (XPS) at bonding energies between 0 and 1200 eV. The peaks at approximately 105 eV, 288 eV, 535 eV, 688 eV and 1033 eV were attributed to Si 2p, C1s, O1s, F1s and Zn 2p, respectively.

The C1s spectrum could be useful for fingerprint identification of polymers. This explains carbon atoms on the surface of the pristine membrane in XPS results were mainly in the form of metal carbonate (280-290 eV) status, while those modified membranes with surface fluorination (FAS 17) were mostly changed to $CF_2$—$CH_2$ (289.48 eV), $CF_2$—$CF_2$ (292 eV) and $CF_3$—$CF_2$ (293.87 eV) status verifying a successful FAS17 graft. For the F2 and the omniphobic membranes, additional carbon atomic spectrum at binding energies between 284 and 288 ev, ascribed to the polymer chains, can be observed, demonstrating that the polymer treatment was successful.

The surface survey data was obtained by high resolution scans over C1s (279-296 eV), O1s (525-545 eV), Zn 2p (1015-1052 eV), Si 2p (95-115 eV) and F1s (678-698 eV). The F/C ratio increased from 0 for the pristine membrane to 0.4, 0.84 and 0.91 for the F1, F2, and the omniphobic membranes indicating that the presence of hydrophobic functional groups grafted on the membrane surface. The small concentration of zinc that appeared in the XPS results demonstrated the presence of the ZnO material on the surface of the omniphobic membrane. Moreover, the pristine membrane had a fluorine concentration near zero, which was evidenced by its intrinsically hydrophilic nature. After the membrane was modified with FAS17 or both FAS17 and the polymer coating, considerable amounts of fluorine were introduced on the membrane surface, which lowered the surface energy of the membrane and rendered it liquid repellent.

Furthermore, the omniphobic membrane exhibited the highest fluorine concentration among the three superhydrophobic membranes. The ZnO nanoparticles greatly enhance the specific surface area of the membrane, and more polymer coating could therefore adhere to the membrane surface. Hence, the omniphobic membrane has a much higher C/Si ratio between 40 and 60.

In conclusion, the invention provides the omniphobic membrane for membrane distillation (MD) by depositing ZnO nanoparticles on a hydrophilic glass fiber (GF) membrane to create hierarchical re-entrant structures, followed by depositing surface fluorination and a polymer coating to lower the surface energy of the membrane. The omniphobic membrane was then compared to GF membranes without deposited nanoparticles in terms of their liquid repellency using contact angle tests with water and ethanol. Direct contact membrane distillation (DCMD) experiments were also conducted to compare the desalination performances of the membranes, and a commonly used surfactant, sodium dodecyl sulfate (SDS), was added to lower the surface tension of the feed solutions.

Representative examples of the invention are described as the following paragraphs ZnO Nanoparticle Deposition ZnO nanoparticles were deposited on a GF membrane using a chemical bath deposition method. The GF membranes contain abundant hydroxyl functional groups that enable surface activation using $KMnO_4$. The GF membrane was placed in a straight-sided round glass jar filled with 100 mL of deionized water and a 12.7 mM $KMnO_4$ aqueous solution containing 250 µL of tert-butanol. The glass jar was closed and placed in a water bath at 84° C. for 40 min. The $KMnO_4$-treated membrane was extensively sonicated several times with clean deionized water in an ultrasonic bath. After the vivid violet color of $KMnO_4$ was completely washed away, the membrane became light orange. Next, the membrane was placed in another glass jar filled with a 50 mM zinc nitrate aqueous solution (87.5 mL of DW) containing 10 mL of triethanolamine and 2.5 mL of ammonium hydroxide. The closed glass jar was placed in a water bath at 96° C. for 40 min. After deposition, the membrane was rinsed with deionized water several times and dried in an oven at 100° C. overnight.

Surface Fluorination

The membrane after ZnO nanoparticle deposition was immersed in a 1% v/v FAS17/n-hexane solution at 40° C. for 24 h and then thoroughly rinsed with hexane. The FAS17-treated membrane was then dried at 90° C. for 2 h.

PVDF-HFP/FAS17 Coating

PVDF-HFP pellets (1.0 g) were mixed with 50 mL of DMF under rigorous stirring until the PVDF-HFP completely dissolved. FAS17 (0.5 mL) was then added into the solution of PVDF-HFP in DMF, and the stirring was continued for another 0.5 h. The FAS17-treated membrane was immersed in the PVDF-HFP/FAS17 solution for 1 min to coat the surface with the PVDF-HFP/FAS17 polymer. The coated fabric was finally dried at 130° C. for 1 h.

Preparation of the Omniphobic Membranes

The omniphobic (OMNI) membrane was prepared by depositing ZnO nanoparticles on a pristine GF membrane using the CBD method followed by surface fluorination and polymer coating. To investigate the influences of FAS17, the polymer coating and the ZnO nanoparticles on the membrane performance one GF membrane (F1) without ZnO nanoparticles was modified using FAS17 and the other membrane (F2) without ZnO nanoparticles was modified using both FAS17 and the polymer coating. The preparation procedures for the F1, F2, and the OMNI membranes are illustrated in FIG. 1.

Membrane Characterization

Scanning electron microscopy (Nova NanoSEM, FEI, USA) was utilized to observe the morphology and microstructure of the membranes. A contact angle goniometer (FTA125, First Ten Angstroms, USA) was used to measure the contact angles of the membranes with water ($\gamma=72.8$ mN/m) and ethanol ($\gamma=22.1$ mN/m). The elemental compositions of the membranes were analyzed using X-ray photoelectron spectroscopy (XPS, Thermo Scientific, Theta Probe, UK). The sample was irradiated with a monochromatic Al K$\alpha$ beam source operating at 1.48668 keV with a 140 W beam power. The base pressure of the sample analysis chamber was $2.0 \times 10^{-9}$ mBar. The spectra were collected in hybrid mode using electrostatic and magnetic lenses with a nominal spot size of 400 μm×400 μm. The elemental fraction (atomic concentration) was calculated by software (CasaXPS Version 2.3.16 PR 1.6) using Gaussian-Lorentzian functions and the C 284.6 eV background from the XPS survey scan.

Direct Contact Membrane Distillation Tests

Figure 2:
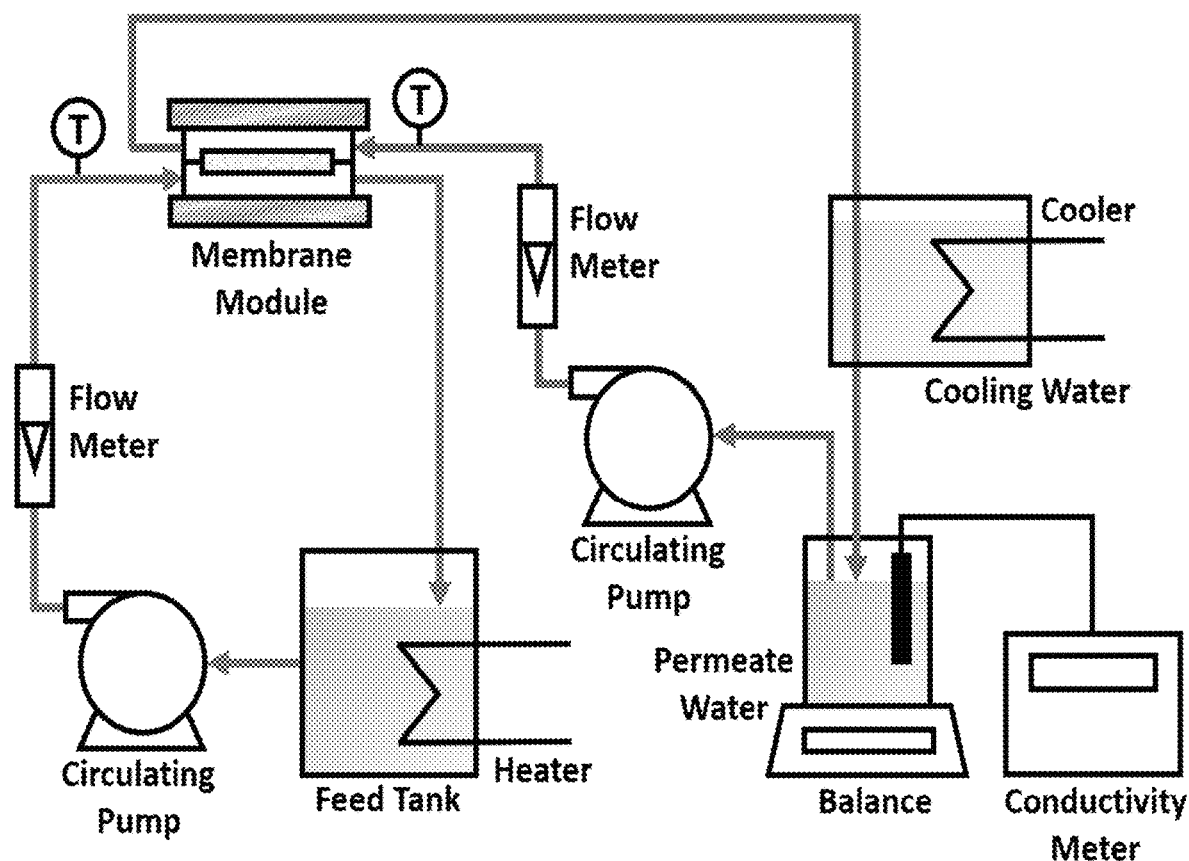
FIG. 2 illustrates schematic diagram of the direct contact membrane distillation setup.
Figure 3A:
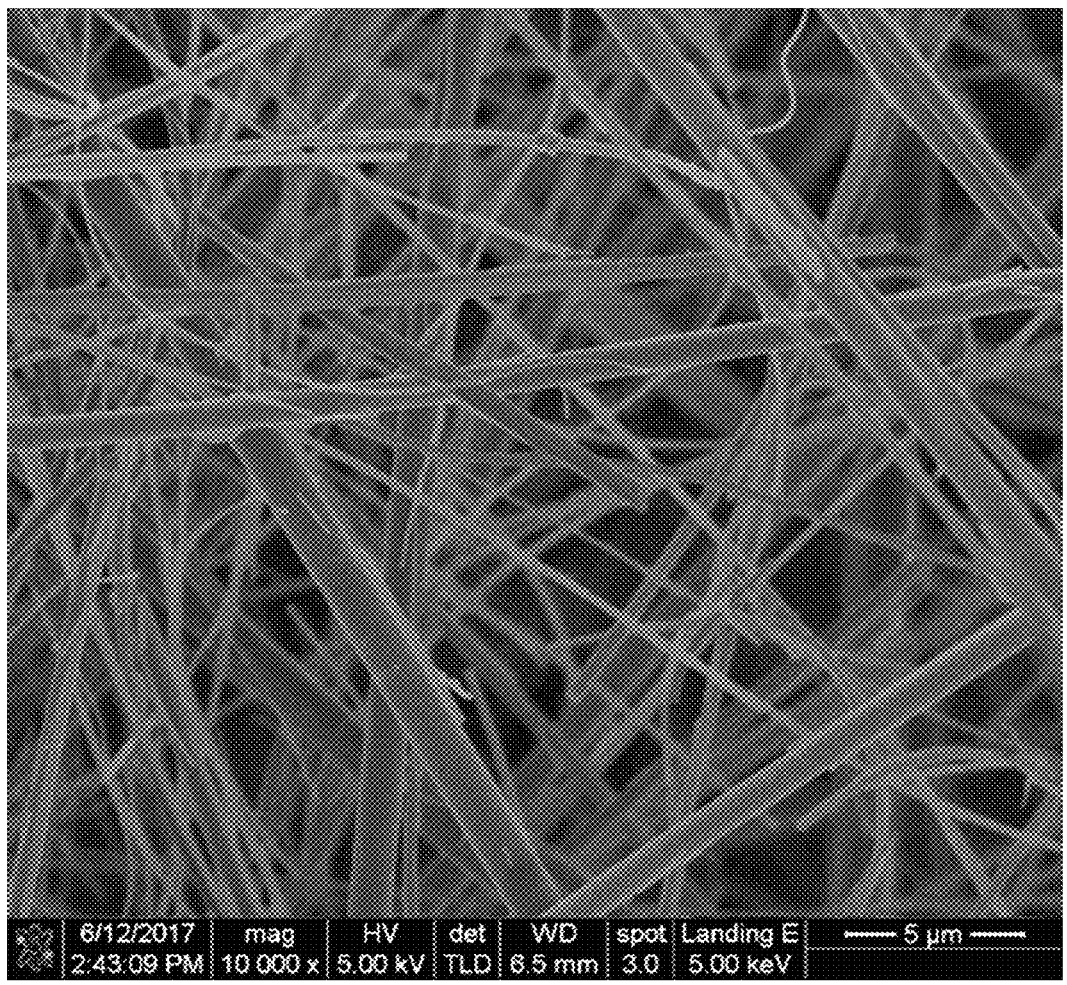
FIG. 3(a) and FIG. 3(b) are SEM images of the GF membrane modified by FAS17 (F1)
Figure 3B:
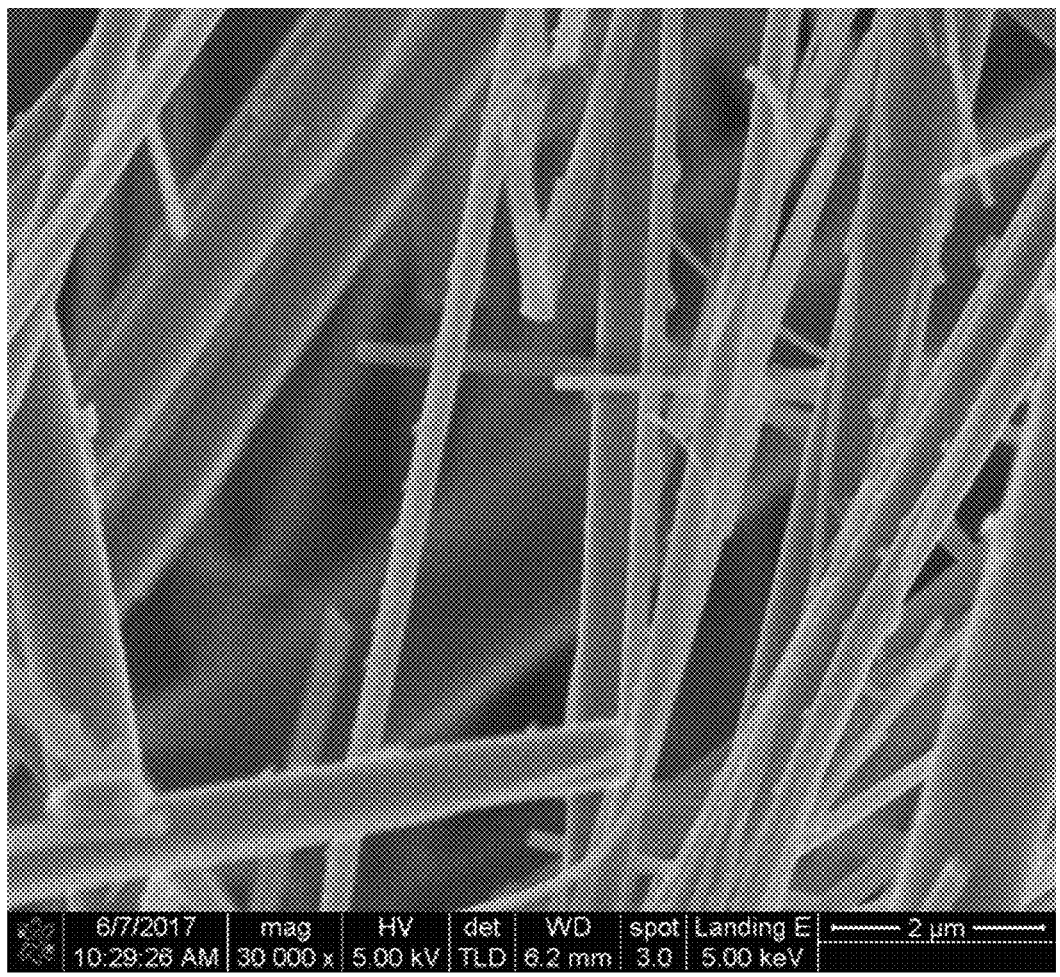
Figure 3C:
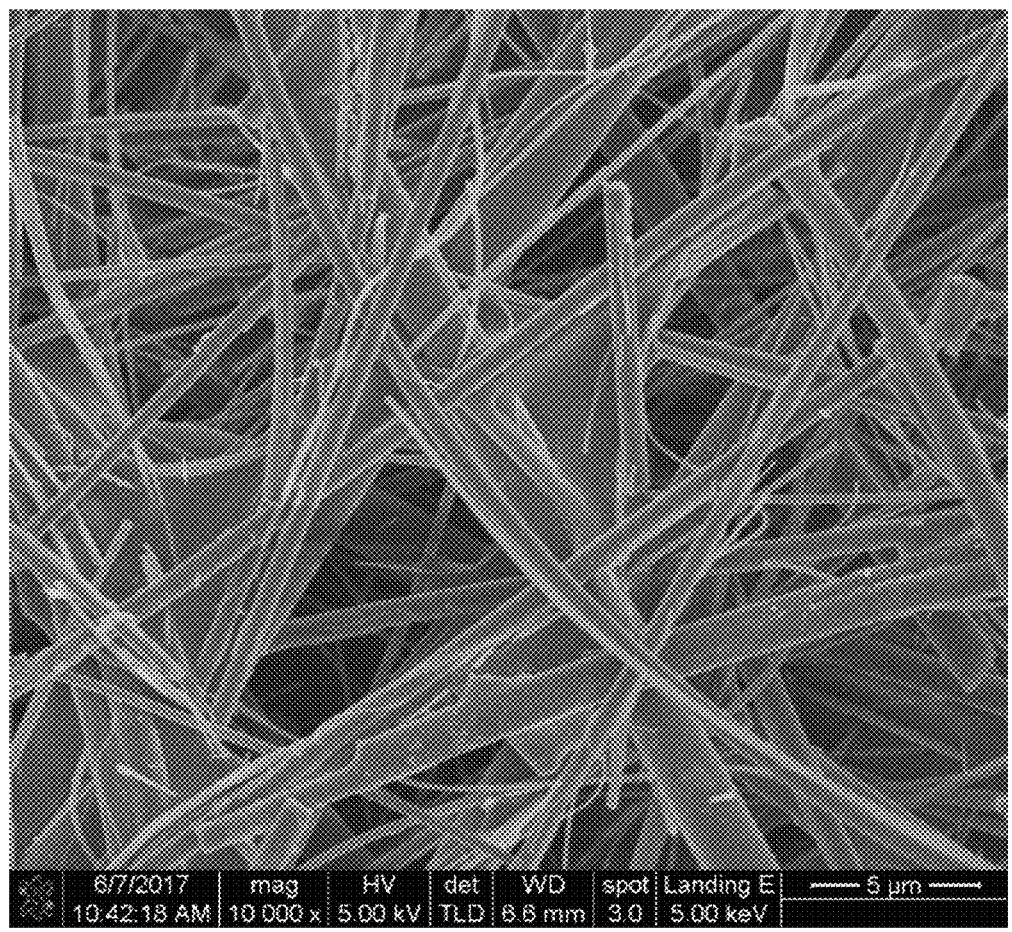
FIG. 3(c) and FIG. 3(d) are SEM images of the GF membrane modified by FAS17 and the polymer coating (F2)
Figure 3D:
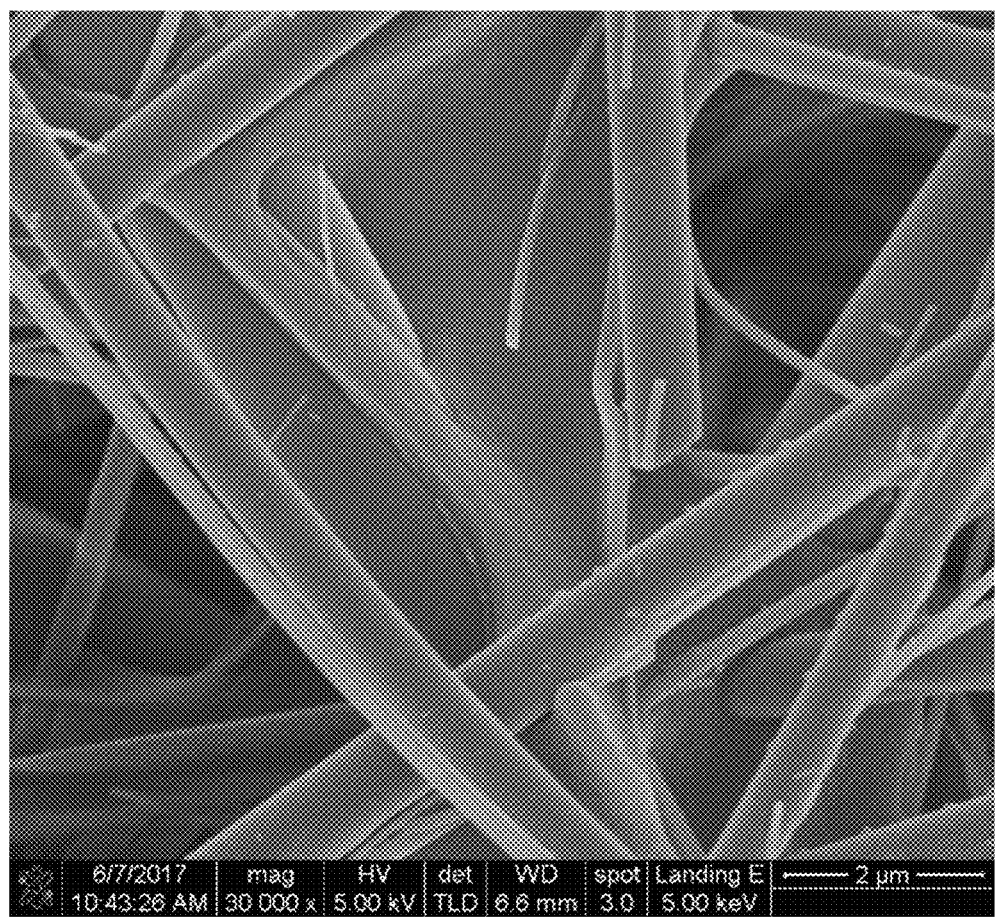
Figure 3E:
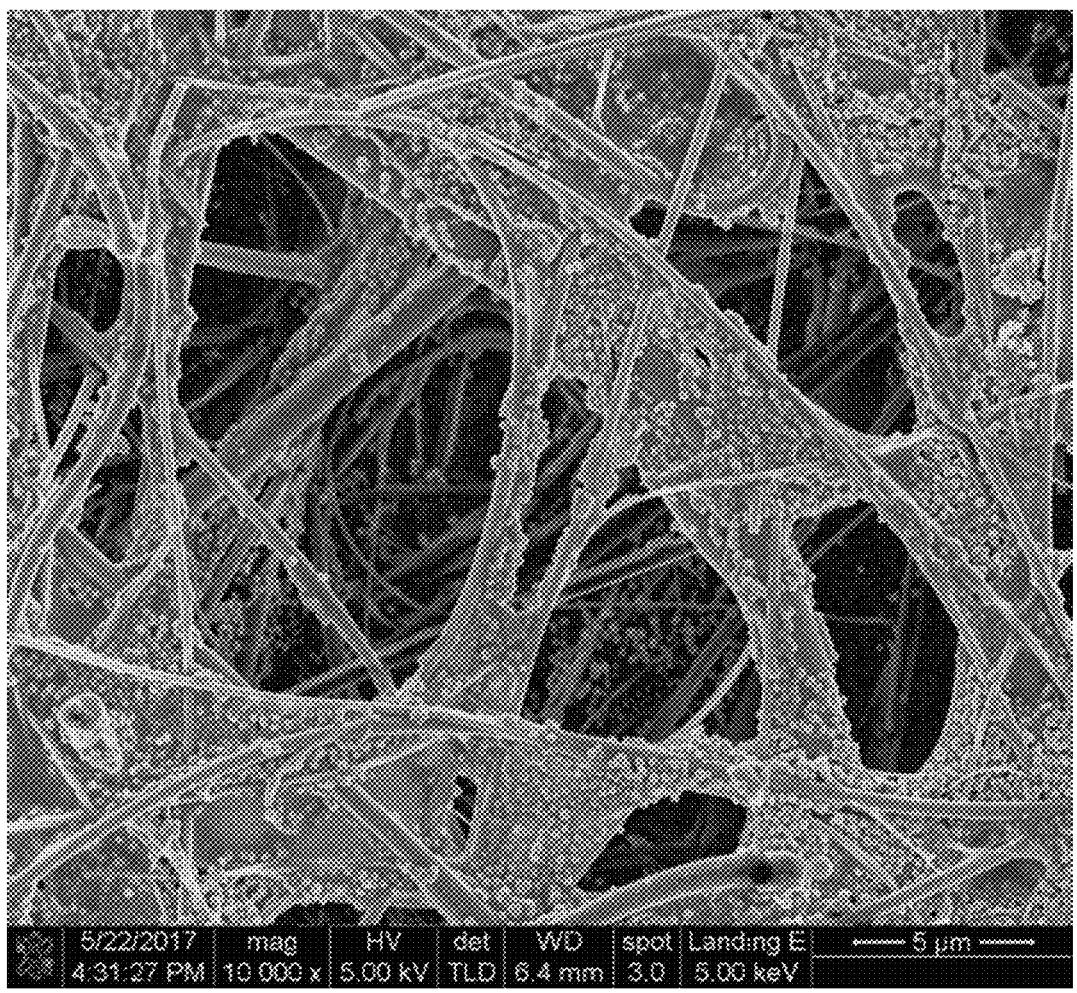
FIG. 3(e) and FIG. 3(f) are SEM images of the GF membrane with ZnO nanoparticles modified by FAS17 and the polymer coating (OMNI)
Figure 3F:
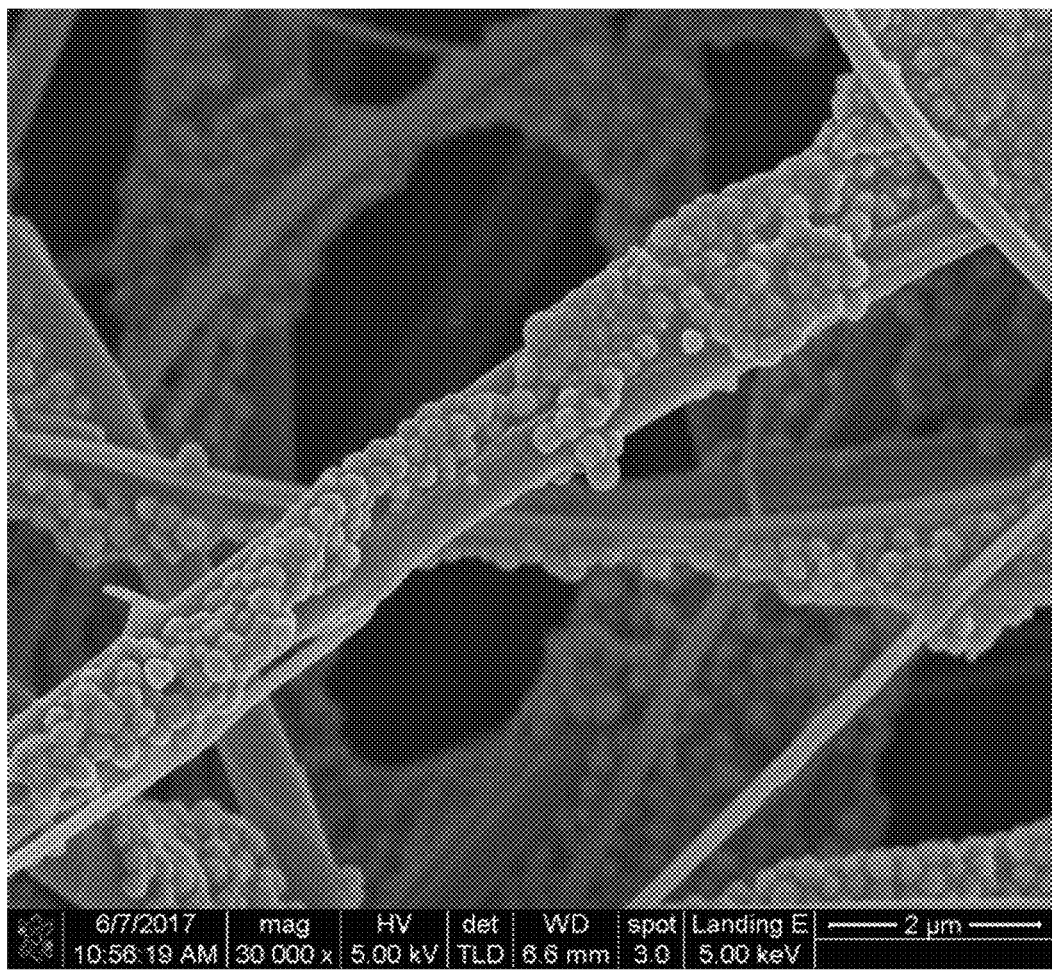

FIG. 2 shows a schematic diagram of the direct contact membrane distillation (DCMD) setup. The circular GF membrane was fixed with a thermally stable silicone rubber ring in a homemade membrane module. A 60° C. 1 M sodium chloride aqueous solution and 20° C. deionized water were circulated on each side of the membrane as the initial feed and the permeate with flow rates of 0.5 L/min and 0.4 L/min, respectively. The active membrane surface area that was exposed to the fluid streams was 10.74 cm². Sodium dodecyl sulfate (SDS), a common surface-active agent in wastewater, was added every 2 h during the DCMD experiments to lower the surface tension of the feed solutions. The SDS concentrations in the feed solution (1 M NaCl at 60° C.) after each sequential SDS addition were 0.1, 0.2 and 0.3 mM. Previous studies have revealed that increasing the temperature and NaCl concentration could significantly reduce the surface tension of the SDS solutions. The corresponding feed surface tension of the 0.1, 0.2 and 0.3 mM SDS solutions (1 M NaCl) was approximately 42, 33, and 31 mN/m, respectively.

The permeate flux was calculated according to the following equation:

$$J = \Delta W_p / A(\Delta t)$$

where J is the permeate flux (kg/m²·h), $W_p$ is the mass of the permeate (kg), A is the active membrane surface area (m²) and $\Delta t$ is the time interval (h)Aaa The conductivity of the feed and permeate was measured using a conductivity meter (InoLab, Cond 7110). The salt rejection was further calculated using the following equation:

$$R_{NaCl} = \frac{C_{NaCl}^{Feed} - C_{NaCl}^{Permeate}}{C_{NaCl}^{Feed}} \times 100\%$$

where $C_{NaCl}^{Feed}$ and $C_{NaCl}^{Permeate}$ are the concentrations of NaCl (mol/m³) in the feed and permeate, respectively. The concentration is assumed to be proportional to the conductivity.

Membrane Morphologies

FIG. 3 displays the SEM images of the surface morphologies of the modified membranes. The GF membrane treated with FAS17 (F1) exhibited fiber-like structures (FIG. 3(a) and FIG. 3(b)), and the same morphology was also observed for the pristine GF membrane. The FAS17 compound could only covalently bind to the membranes and did not affect the membrane morphology. It was noted that the cylindrical fiber structures of the GF membrane provided primary re-entrant structures. For the GF membrane modified by FAS17 and the polymer coating (F2), the fibrous structures remained on the membrane surface, and a thin film was observed that extended across the fibers (FIG. 3(c) and FIG. 3(d)). In contrast, the GF membrane that contained ZnO nanoparticles and was modified by FAS17 and the polymer coating (OMNI) had a remarkably different membrane morphology than both the F1 and F2 membranes (FIG. 3(e) and FIG. 3(f)). A particulate morphology was clearly observed on the fiber surfaces of the OMNI membrane, and the average diameter of the ZnO nanoparticles was approximately 271.3±30.6 nm. It was found that the presence of ZnO nanoparticles on the primary re-entrant structures of the GF membrane resulted in hierarchical re-entrant structures. Moreover, a polymer thin film covered the ZnO nanoparticles around the fiber surfaces. The polymer coating was important for immobilizing the ZnO nanoparticles and improving their durability.

Membrane Characterization

Surface elemental analysis were conducted for three modified (F1, F2 and OMNI) membranes with FAS 17 and PVDF-HFP/FAS 17 and the pristine GF membrane by using X-ray photoelectron spectroscopy scan at bonding energies between 0 and 1200 eV. FIG. 4(a), FIG. 4(c), FIG. 4(e) and FIG. 4(g) show the full XPS spectrum of these four membranes. The peaks at approximately 105 eV, 288 eV, 535 eV, 688 eV and 1033 eV were attributed to Si 2p, C1s, O1s, F1s and Zn 2p, respectively.

Figure 4A:
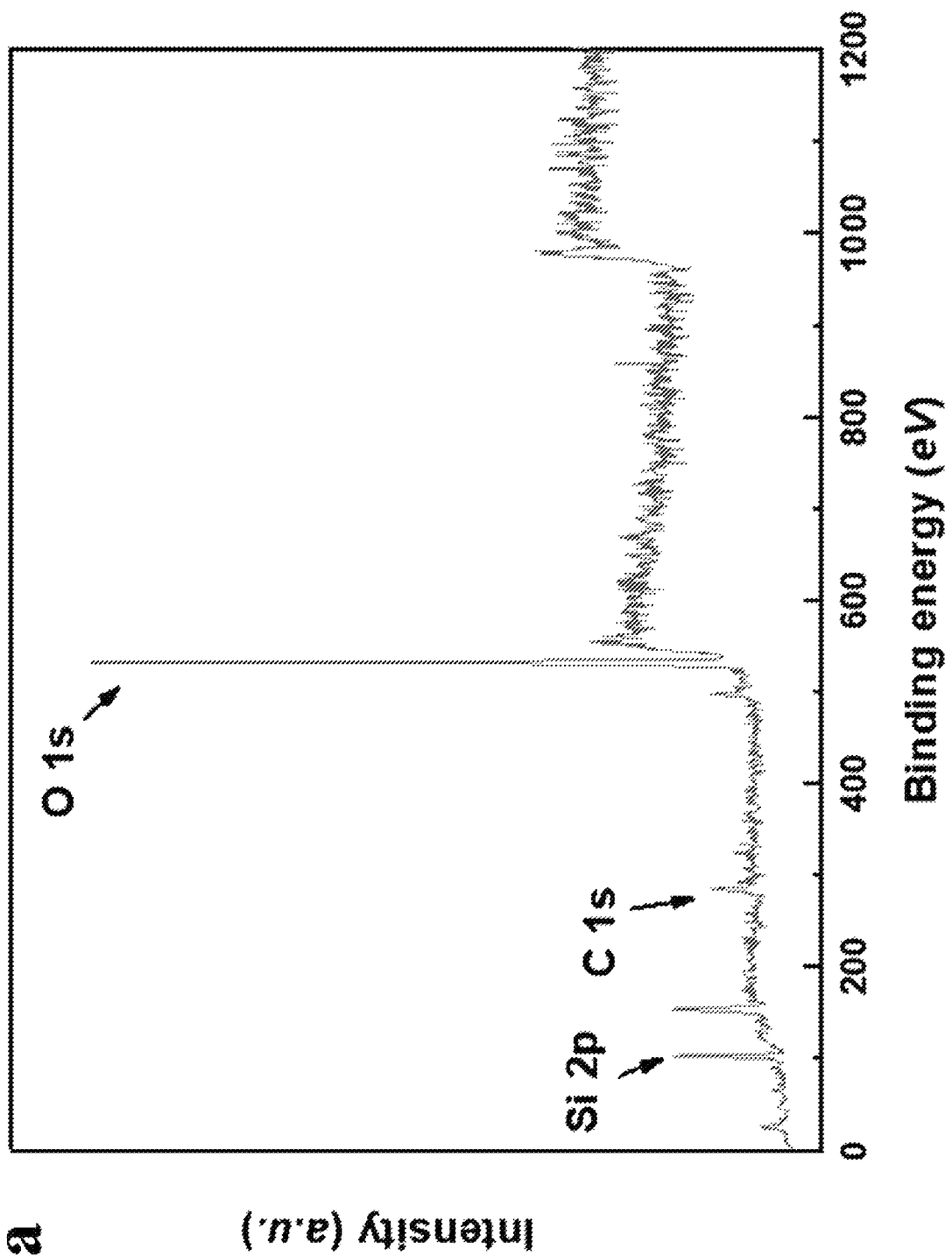
FIG. 4 show XPS survey scans, where FIG. 4 (a) is XPS survey scans of the pristine GF, FIG. 4 (b) is Carbon spectrum of the pristine GF, FIG. 4 (c) is XPS survey scans of the F1, FIG. 4 (d) is Carbon spectrum of the F1, FIG. 4 (e) is XPS survey scans of the F2, FIG. 4 (f) is Carbon spectrum of the F2 FIG. 4 (g) is XPS survey scans of the OMNI and FIG. 4 (h) is Carbon spectrum of the OMNI.
Figure 4B:
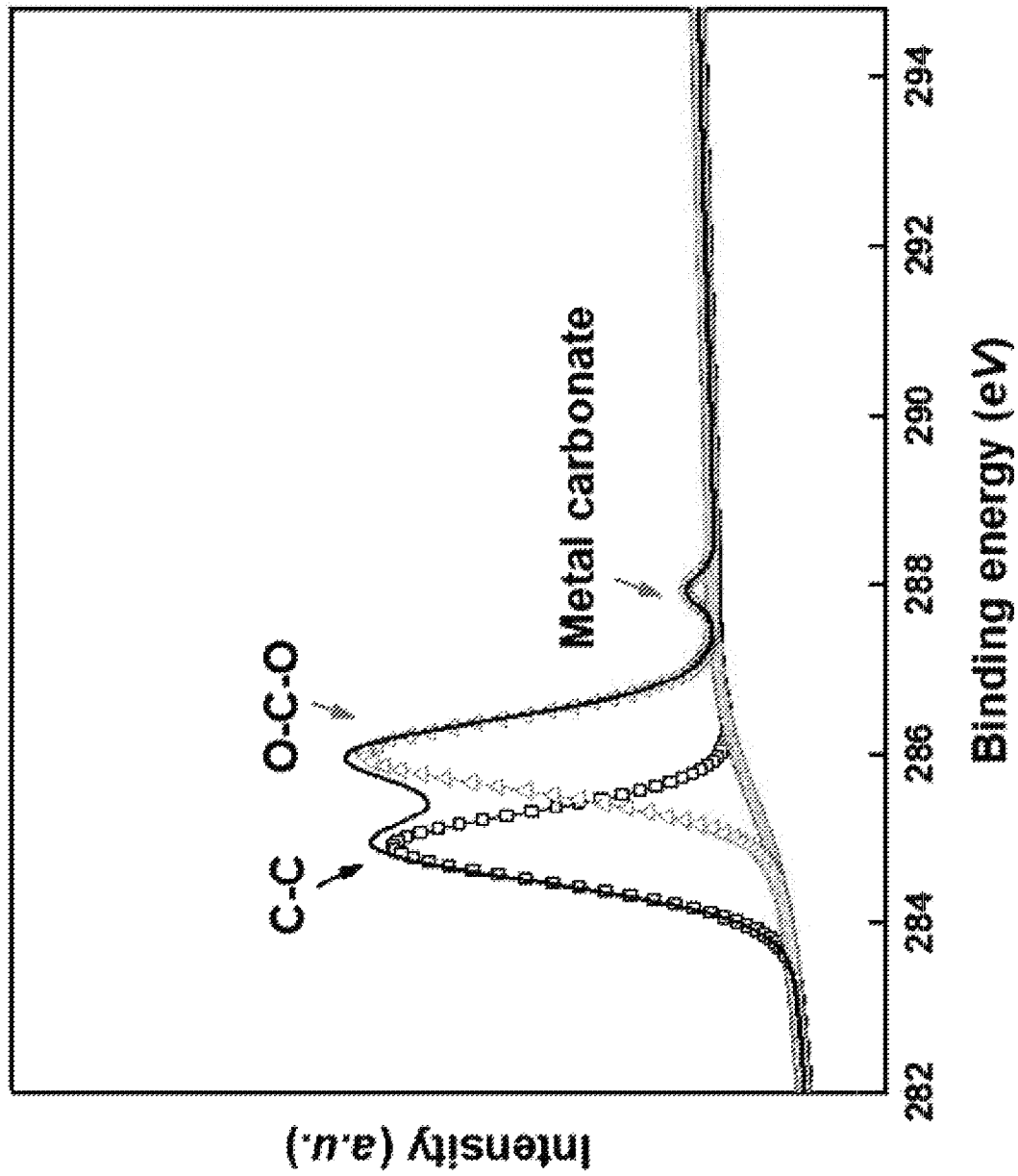
Figure 4C:
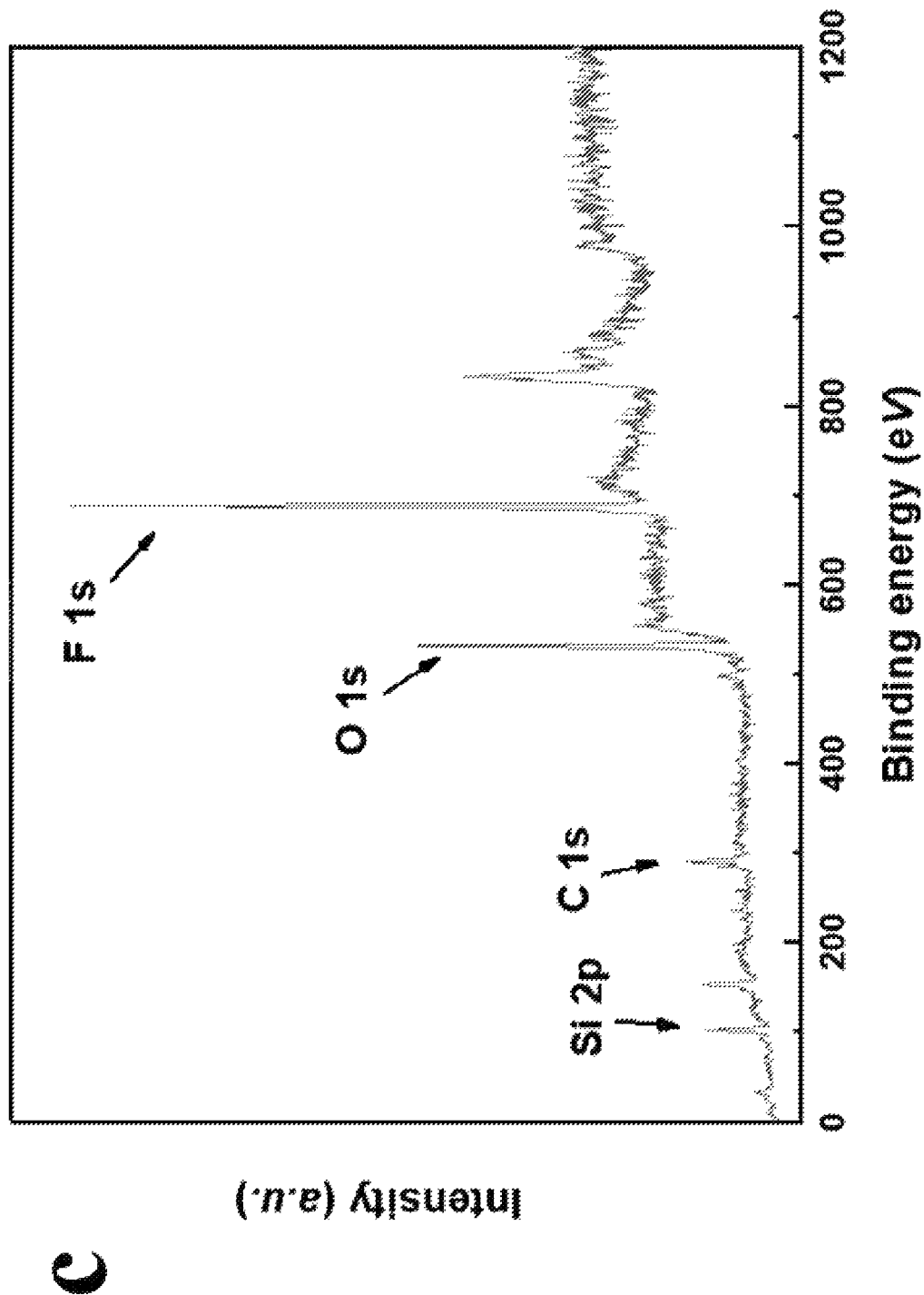
Figure 4D:
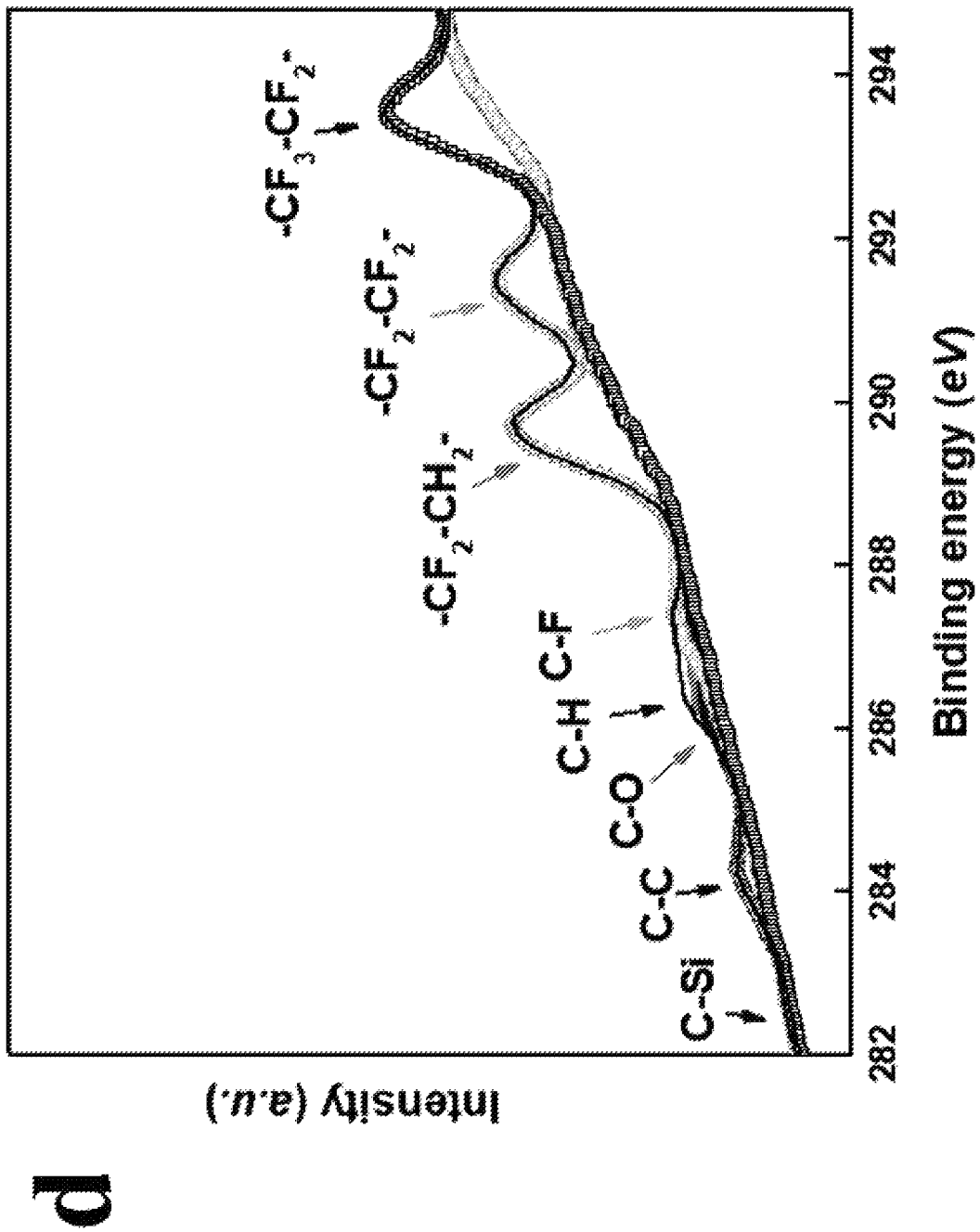
Figure 4E:
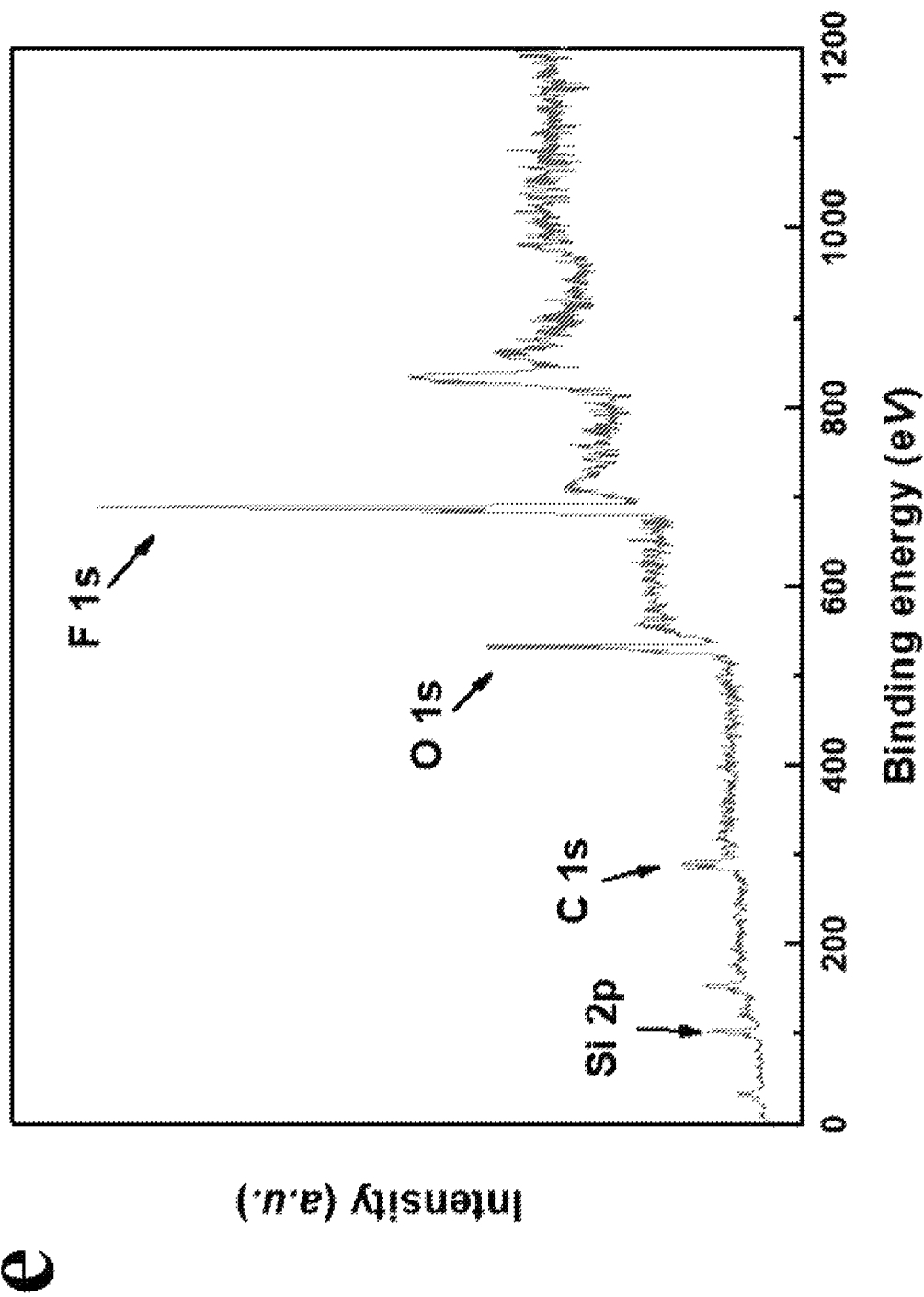
Figure 4F:
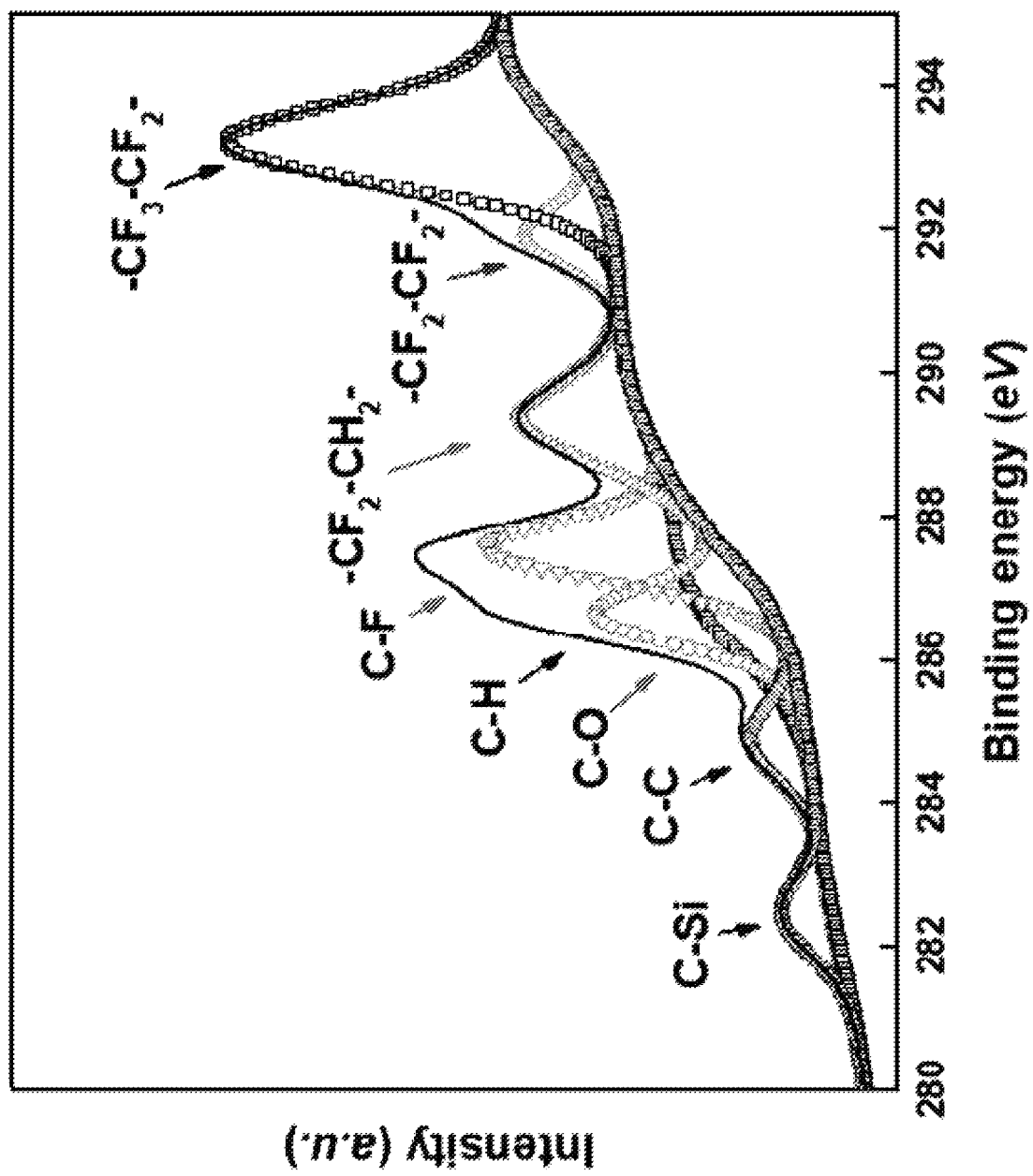
Figure 4G:
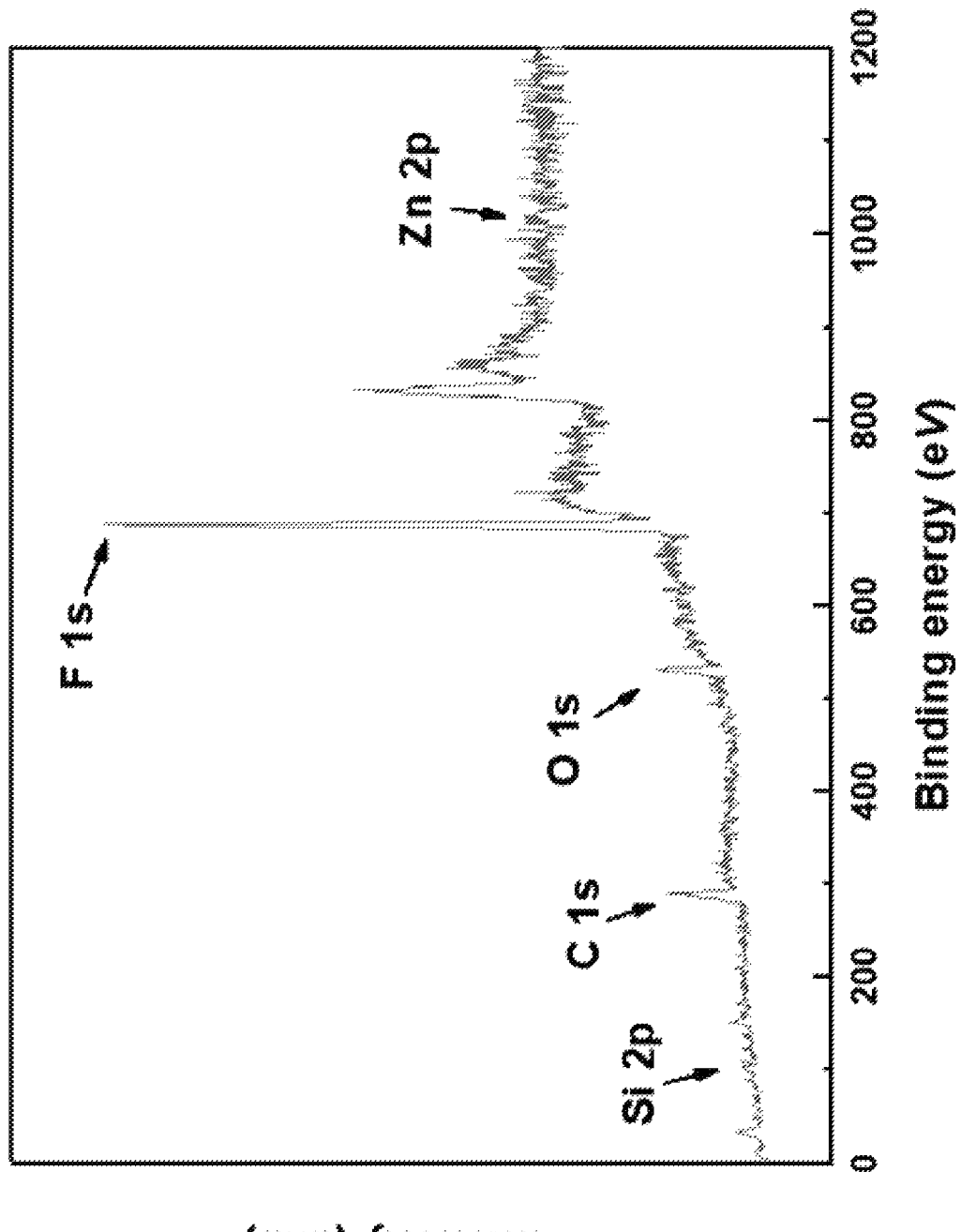
Figure 4H:
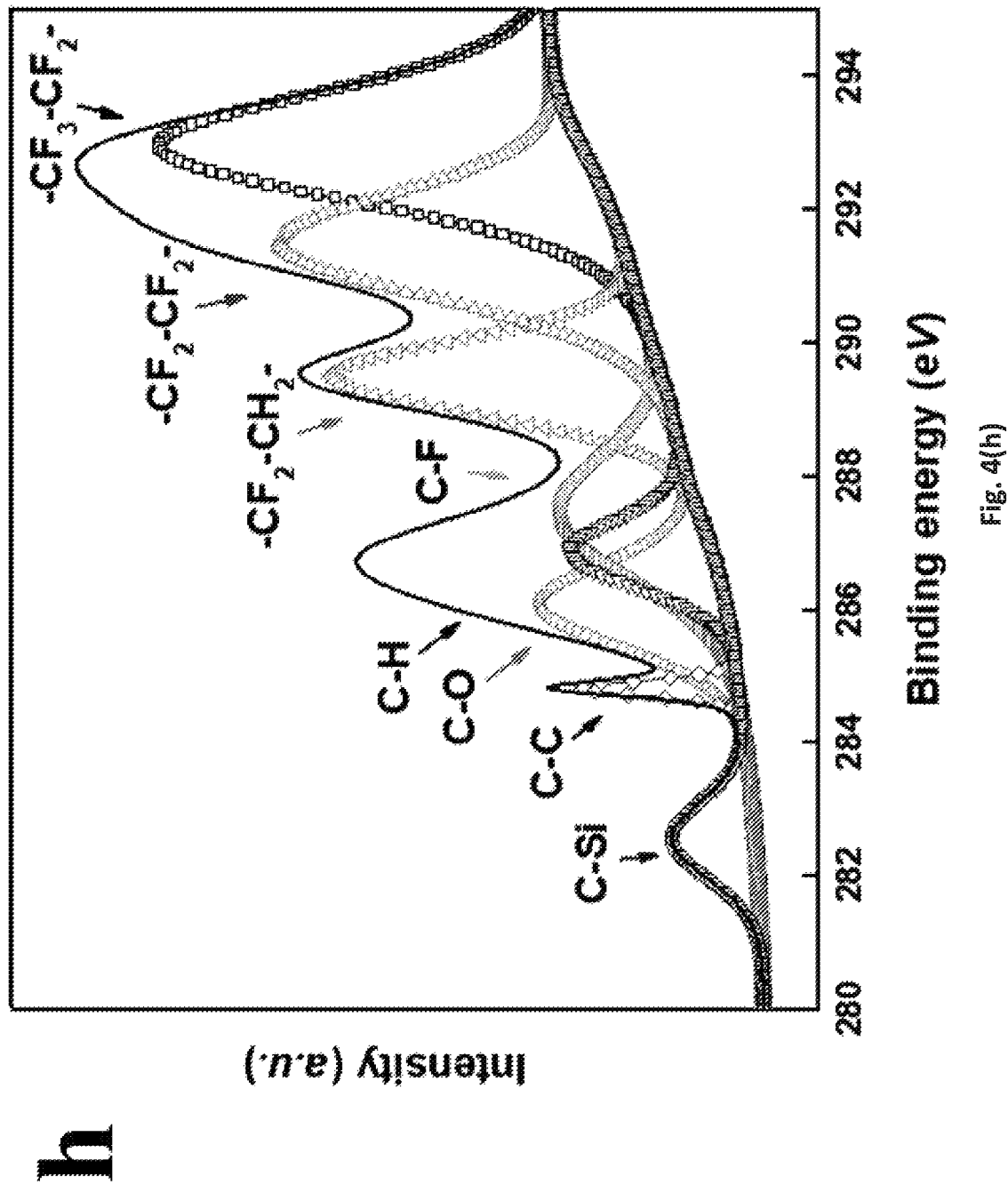

The C1s spectrum could be useful for fingerprint identification of polymers. This explains carbon atoms on the surface of the pristine GF membrane in XPS results were mainly in the form of metal carbonate (280-290 eV) status, while those modified membranes with surface fluorination (FAS 17) were mostly changed to $CF_2$—$CH_2$ (289.48 eV), $CF_2$—$CF_2$ (292 eV) and $CF_3$—$CF_2$ (293.87 eV) status verifying a successful FAS graft. For the F2 and OMNI membranes, additional carbon atomic spectrum at binding energies between 284 and 288 eV, ascribed to the polymer chains, can be observed, demonstrating that the polymer treatment was successful, as shown in FIG. 4(f) and FIG. 4(h).

Figure 5:
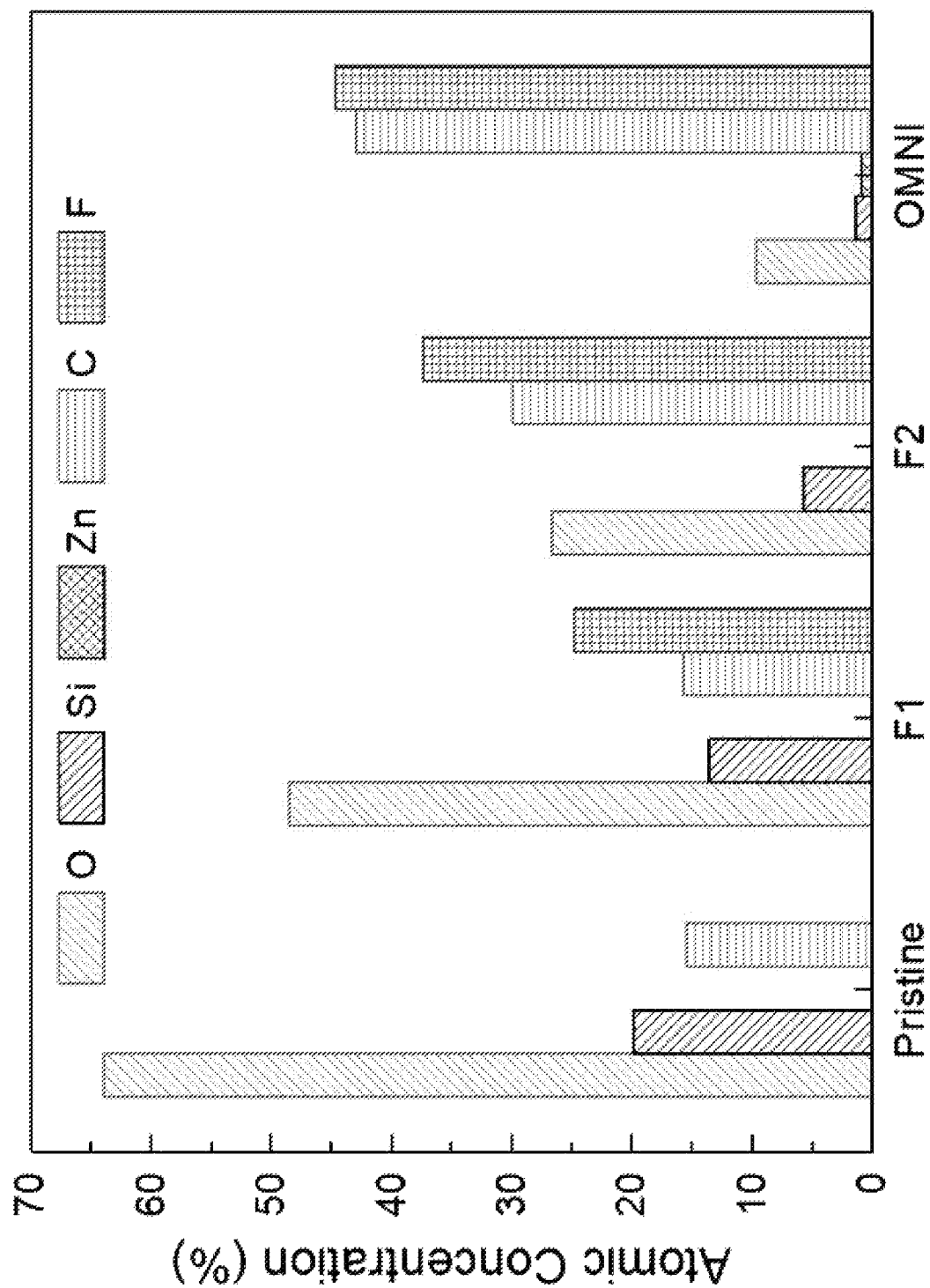
FIG. 5 is a bar diagram of XPS analysis of the pristine GF membrane, the GF membrane modified by FAS17 (F1), the GF membrane modified by FAS17 and the polymer coating (F2), and the GF membrane with ZnO nanoparticles modified by FAS17 and the polymer coating (OMNI)

FIG. 5 shows the qualitative analysis of the contained elements for the pristine GF, F1, F2, OMNI membranes, and surface survey data was obtained by high resolution scans over C1s (279-296 eV), O1s (525-545 eV), Zn 2p (1015-1052 eV), Si 2p (95-115 eV) and F1s (678-698 eV). The F/C ratio increased from 0 for the pristine GF membrane to 0.4, 0.84 and 0.91 for the F1, F2, and OMNI membranes indicating that the presence of hydrophobic functional groups grafted on the membrane surface. The small concentration of zinc that appeared in the XPS results demonstrated the presence of the ZnO material on the surface of the OMNI membrane. Moreover, the pristine membrane had a fluorine concentration near zero, which was evidenced by its intrinsically hydrophilic nature. After the membrane was modified with FAS17 or both FAS17 and the polymer coating, considerable amounts of fluorine were introduced on the membrane surface, which lowered the surface energy of the membrane and rendered it liquid repellent. Furthermore, The OMNI membrane exhibited the highest fluorine concentration among the three superhydrophobic membranes. The ZnO nanoparticles greatly enhance the specific surface area of the membrane, and more polymer coating could therefore adhere to the membrane surface.

The C/Si ratio increased from 4.77 for the pristine GF membrane to 6.1 for the F1 membranes indicating that FAS 17 had been grafted on the surface of F1 membrane while the C/Si ratio increased from 4.53 for the F2 membrane to 45 for the OMNI membrane due to the highest specific surface area of the OMNI membrane.

Contact Angles and Wetting Behavior of the Membranes

Figure 6:
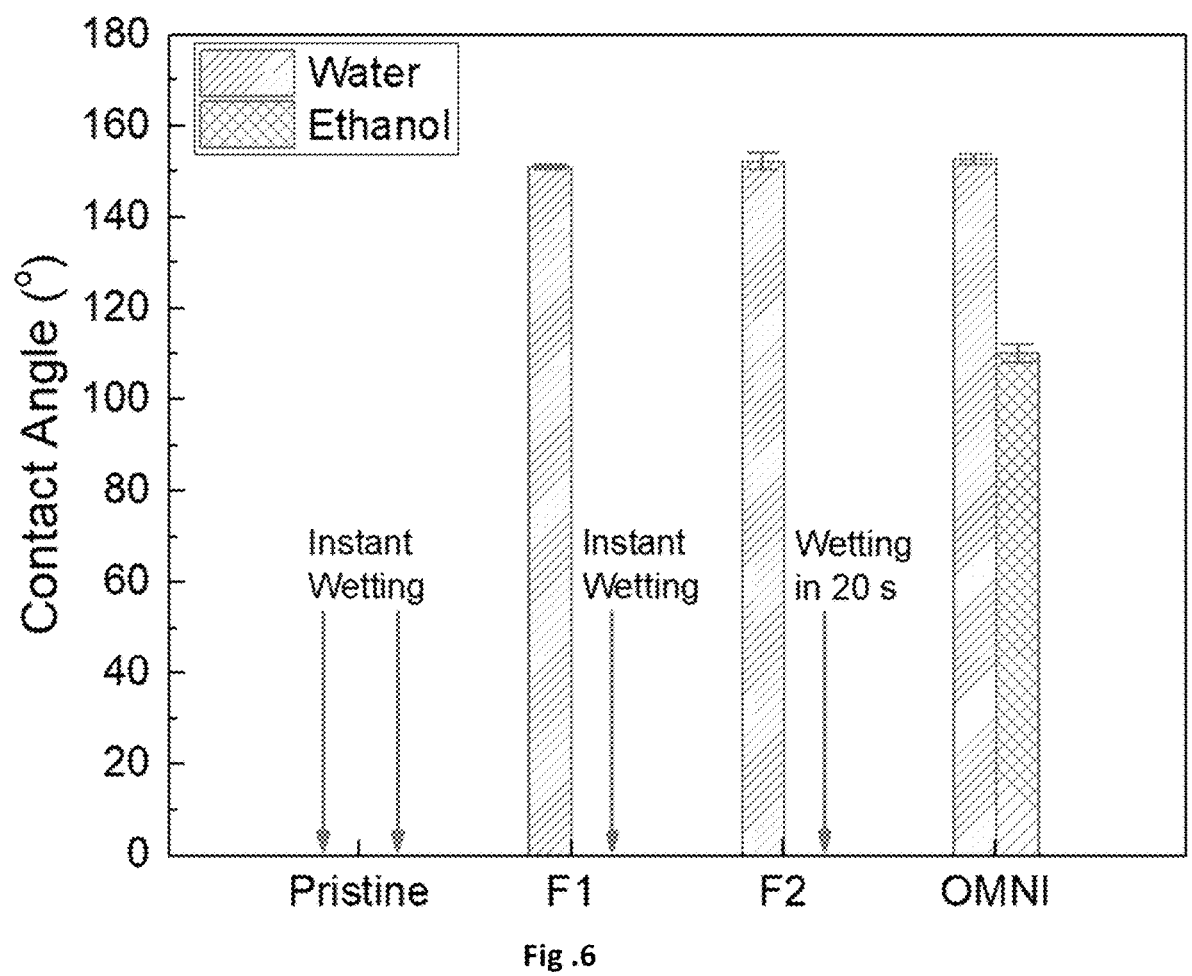
FIG. 6 includes a diagram of contact angles of a 2 μm liquid droplet of water and ethanol for the pristine GF membrane, the GF membrane modified by FAS17 (F1), the GF membrane modified by FAS17 and the polymer coating (F2), and the GF membrane with ZnO nanoparticles modified by FAS17 and the polymer coating (OMNI). The blue and pink droplets in the photos are water and ethanol, respectively.

FIG. 6 shows the contact angles of the F1, F2 and OMNI membranes with a 2 μm liquid droplet of water ($\gamma$=72.8 mN/m) and ethanol ($\gamma$=22.1 mN/m). Water and ethanol were used to test the hydrophobicity and the oleophobicity of the membranes, respectively. The pristine GF membrane was intrinsically hydrophilic, and both ethanol and water were instantly absorbed into the membrane pores without observable contact angles. The three modified (F1, F2 and OMNI) membranes were superhydrophobic with water contact angles greater than 150°. The superhydrophobicity was attributable to the surface roughness of the pristine GF membranes as well as the low surface free energy achieved by FAS17 and the polymer coating. However, instant wetting of the F1 membrane with ethanol was observed without a measurable contact angle. For the F2 membrane, the ethanol droplet could initially stand on the membrane, but then, it gradually absorbed into the GF membrane within 20 s. This result revealed that the polymer coating could further lower the surface energy so that the F2 membrane had a higher wetting resistance to low surface tension liquids than the F1 membrane. In contrast, the OMNI membrane exhibited oleophobic characteristics and was not wetted by an ethanol droplet, resulting in an ethanol contact angle as high as 110.3±1.9°. This result suggested that the deposition of ZnO nanoparticles played an important role in the membrane omniphobicity. The hierarchical re-entrant structures on the OMNI membrane could sustain a metastable Cassis thermodynamic state in which the low surface tension ethanol was supported by a composite solid-liquid-air interface. Therefore, the hierarchical re-entrant structures were critical for achieving surface omniphobicity in the OMNI membrane.

Membrane DCMD Performance

The performance of the F1, F2 and OMNI membranes was tested during DCMD experiments, and SDS was introduced into the feed solution with progressively increasing concentrations to investigate the wetting resistance of the three modified membranes (FIG. 7). The salt rejection rates were always near 100% for all experiments. The 60° C. 1 M feed solution had a conductivity value as high as 80,000 μS/cm, whereas that of the permeate was 20 μS/cm. As shown in FIG. 7(a), the GF membrane modified by FAS17 (F1) exhibited a stable water flux without the addition of SDS, demonstrating that FAS17 was effectively grafted on the membrane surface to achieve membrane hydrophobicity. However, the water flux began to drop after the introduction of 0.1 mM SDS to the feed. The GF membrane modified by FAS17 and the polymer coating (F2) showed a stable MD performance without changes in the water flux for 0.1 mM SDS in the feed, but the performance drastically decreased immediately after 0.2 mM SDS was added (FIG. 7(b)). Although the wetting resistance of the membrane was further enhanced by the hydrophobic polymer coating, the primary re-entrant structures of the F1 and F2 membranes had a limited ability to prevent pore wetting. As SDS was added, the reduced surface tension caused the liquid-air interface to sag, and the low surface tension feed solution impinged upon the next layer of fibers, leading to a transition to the Wenzel state. The liquid entry pressures were thus reduced, and the membrane pores were partially wetted by the feed solution (FIG. 8(a)). The penetration of the feed solution into the membrane pores resulted in a substantial increase in the mass transfer resistance against water vapor diffusion. In contrast, the GF membrane that contained ZnO nanoparticles and was modified by FAS17 and the polymer coating (OMNI) exhibited the highest wetting resistance to the low surface tension feed solution (FIG. 7(c)). The initial water flux was maintained after the addition of 0.3 mM SDS to the feed, which corresponded to a solution surface tension of approximately 31 mN/m. The robustness of the OMNI membrane was attributable to not only the hierarchical re-entrant structures created by the deposition of the ZnO nanoparticles but also the low surface energy of FAS17 and the polymer coating. The combination of the hierarchical re-entrant structures and the low surface energy enabled a metastable Cassie state at the local liquid-solid-vapor interface, which allowed the membrane to possess pores that were not wetted by the solution with the lowest barrier for the diffusion of water vapor (FIG. 8(b)). Therefore, the OMNI membrane demonstrated superior wetting resistance to the low surface tension feed solution, and the highest DCMD performance was maintained.

This is very important to investigate the DCMD performance with the evaluation of the membrane wetting phenomena. In laboratory experiment, the membrane temperature decreases during the night shutdown. This may cause the salt precipitation from the feed, which accelerates membranes wetting so the possibility of the reusability for the omniphobic membranes have to be evaluated by several module cleaning cycles.

Figure 7A:
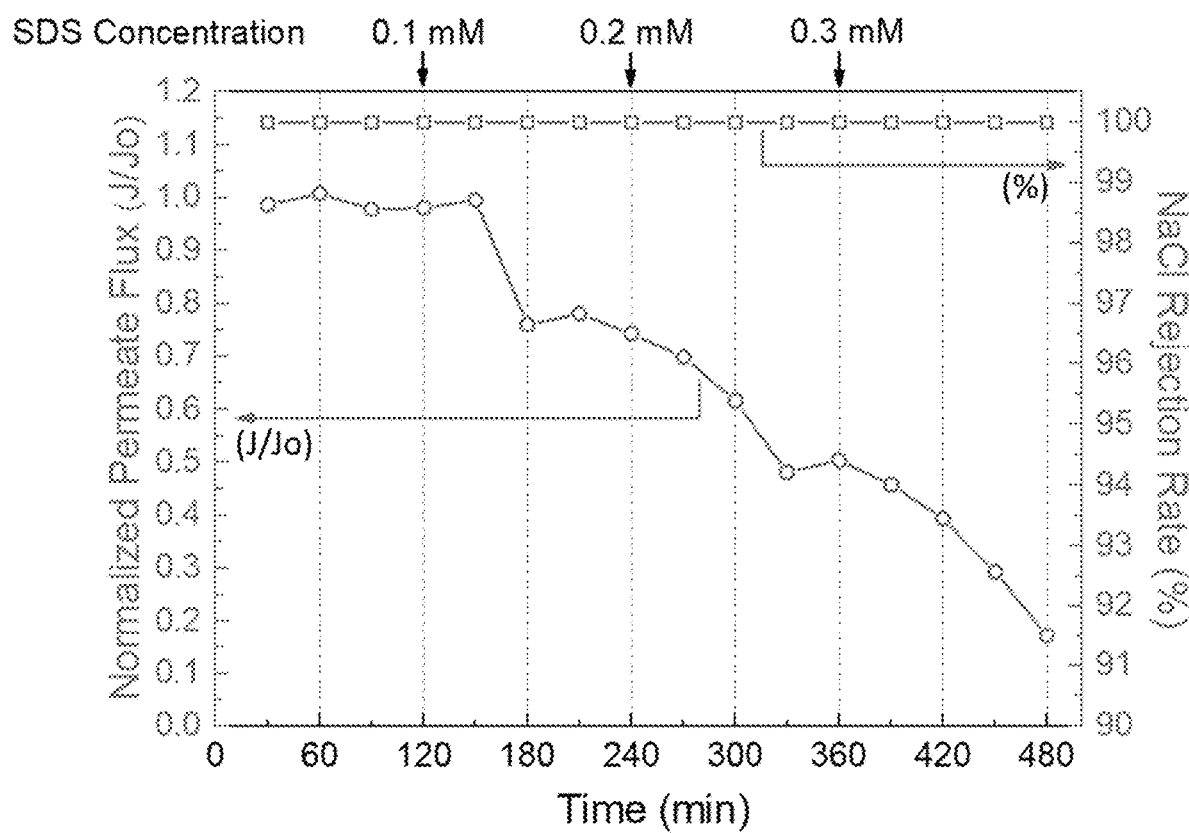
FIG. 7(a) is the GF membrane modified by FAS17 (F1)
Figure 7B:
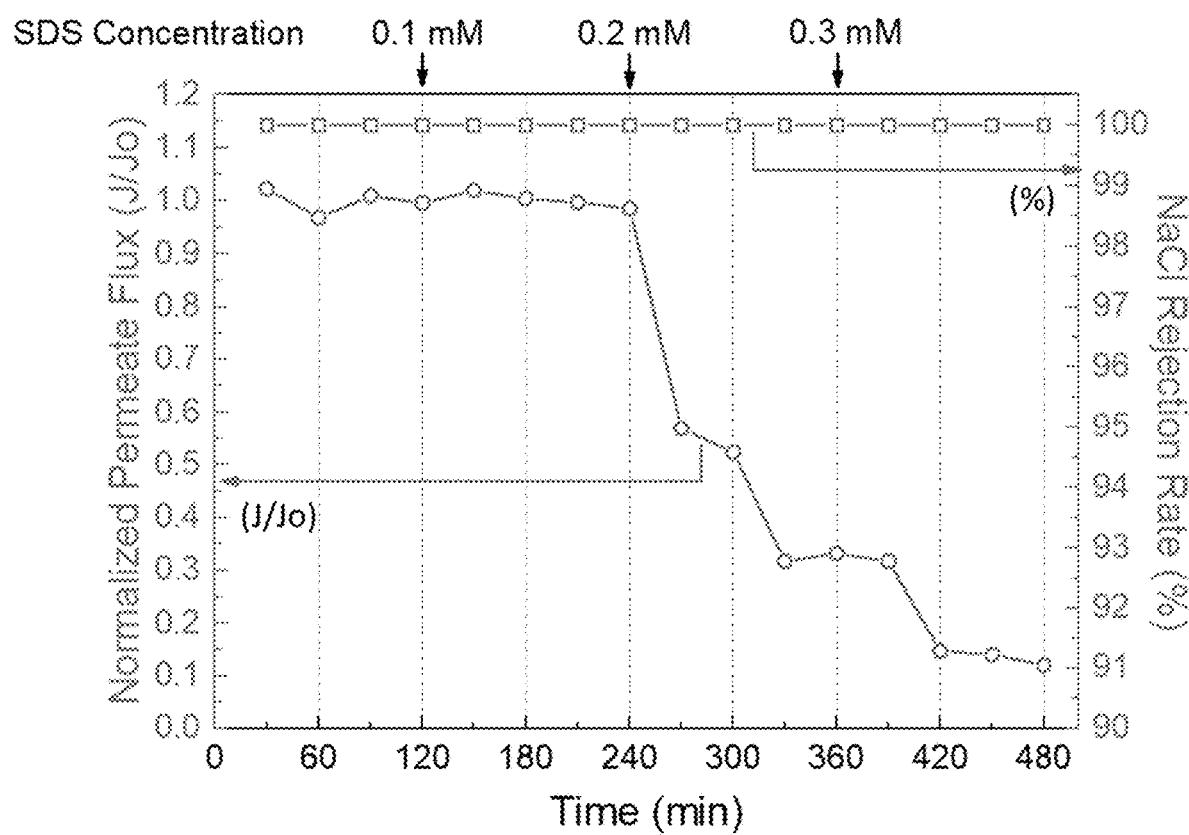
FIG. 7(b) is the GF membrane modified by FAS17 and the polymer coating (F2)
Figure 7C:
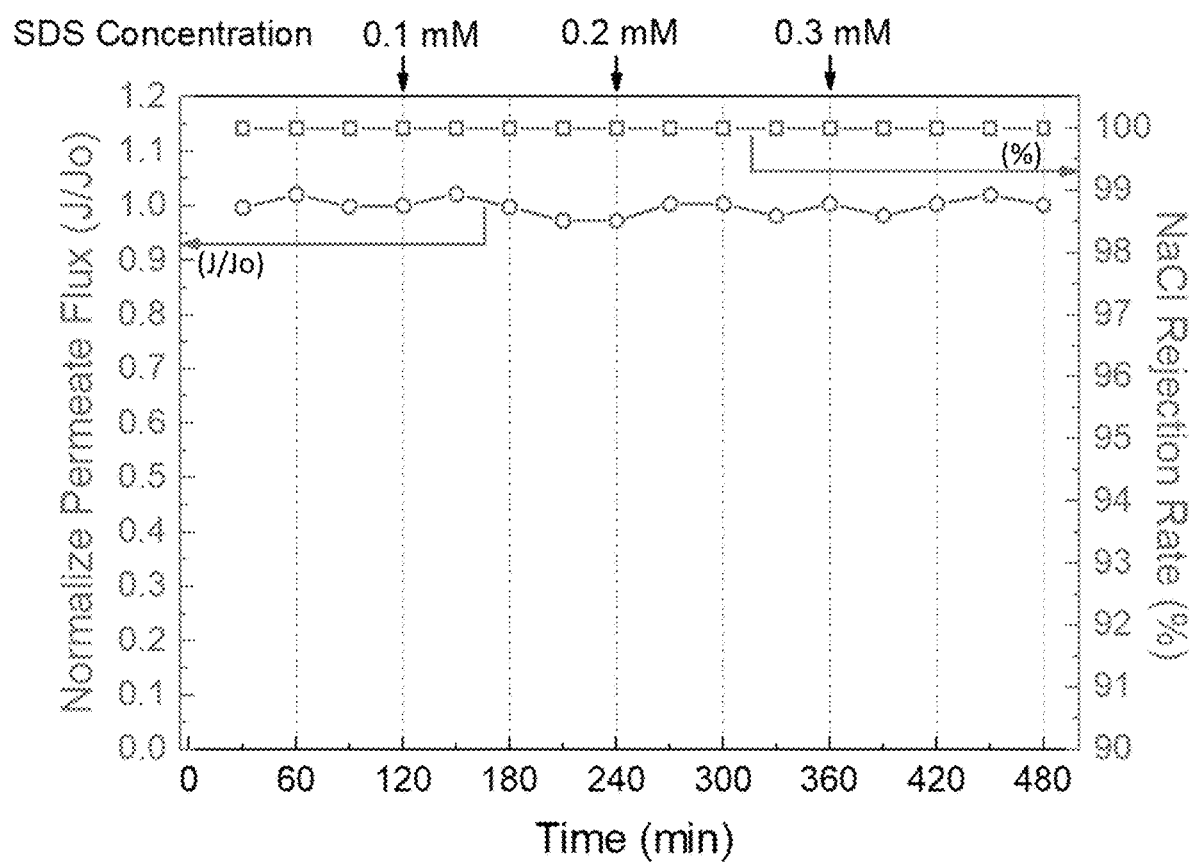
FIG. 7(c) is the GF membrane with ZnO nanoparticles modified by FAS17 and the polymer coating (OMNI), and the initial permeate fluxes ($J_0$) of the F1, F2, and OMNI membranes were 12.5±0.2, 12.4±0.2 and 11.4±0.9 kg/m$^2$-h, respectively.
Figure 7D:
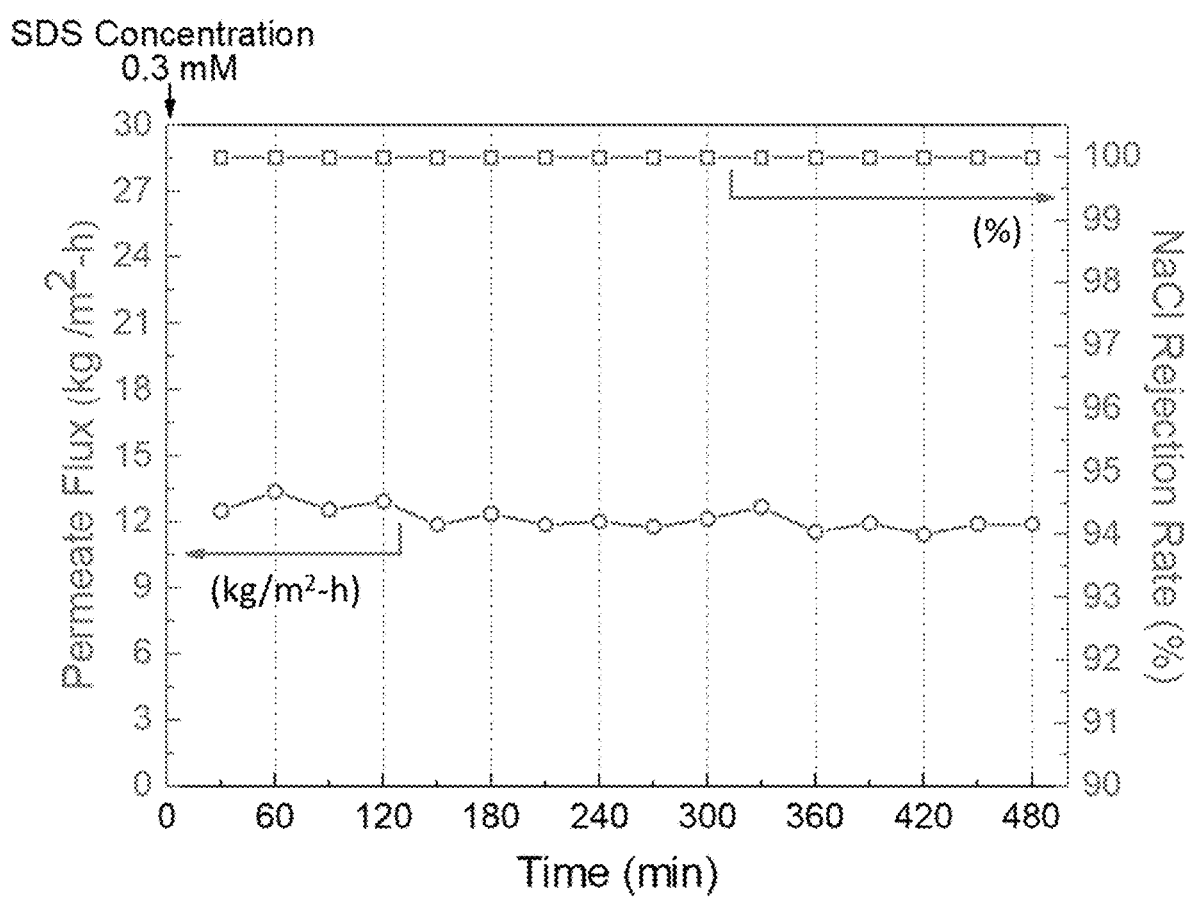
FIG. 7(d) is the long-term operation of the DCMD experiment was achieved from the OMNI membrane for the separation of DI water with the 0.3 mM SDS solutions as feed.
Figure 7E:
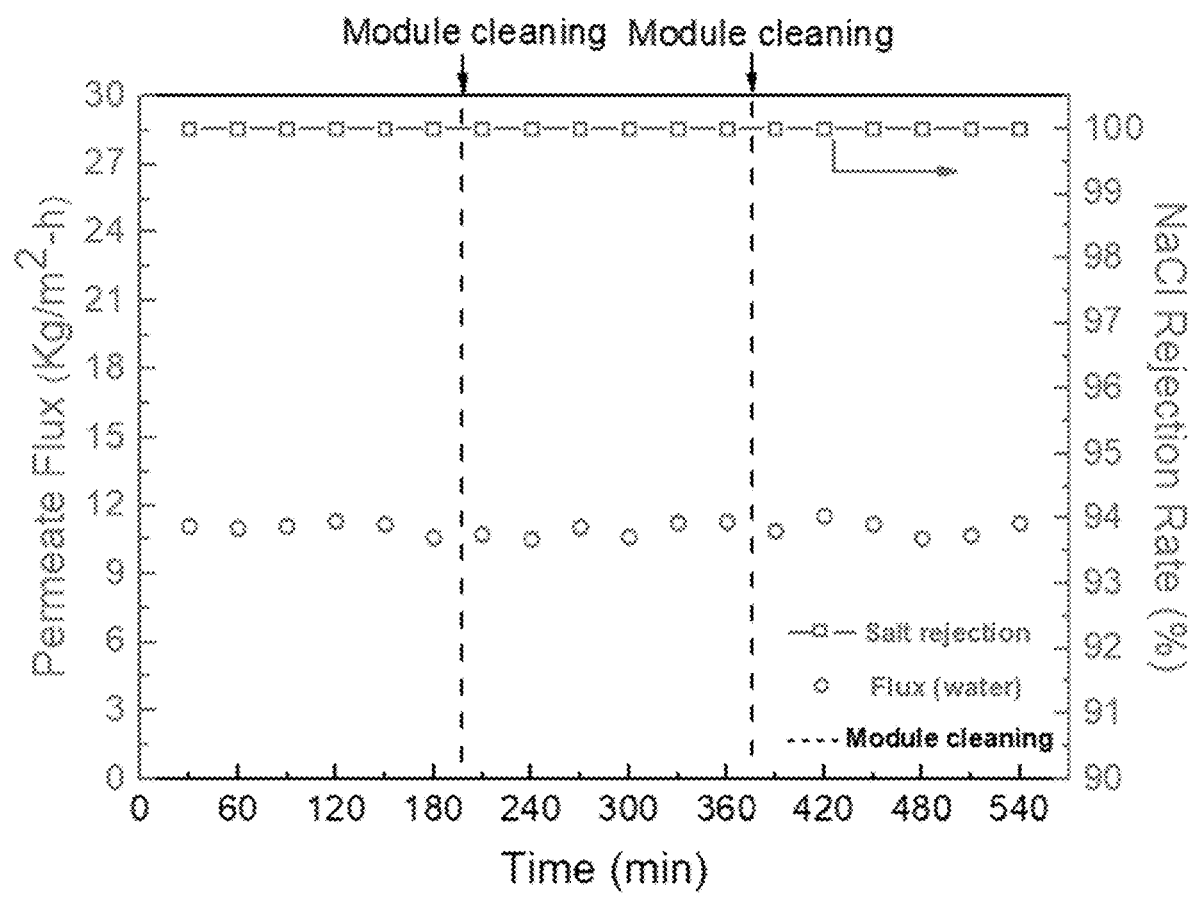
FIG. 7(e) is the water flux of the OMNI membrane attained the same water flux approximately 11.7 kg/m$^2$-h for each module cleaning cycle in the reusability test.
Figure 8A:
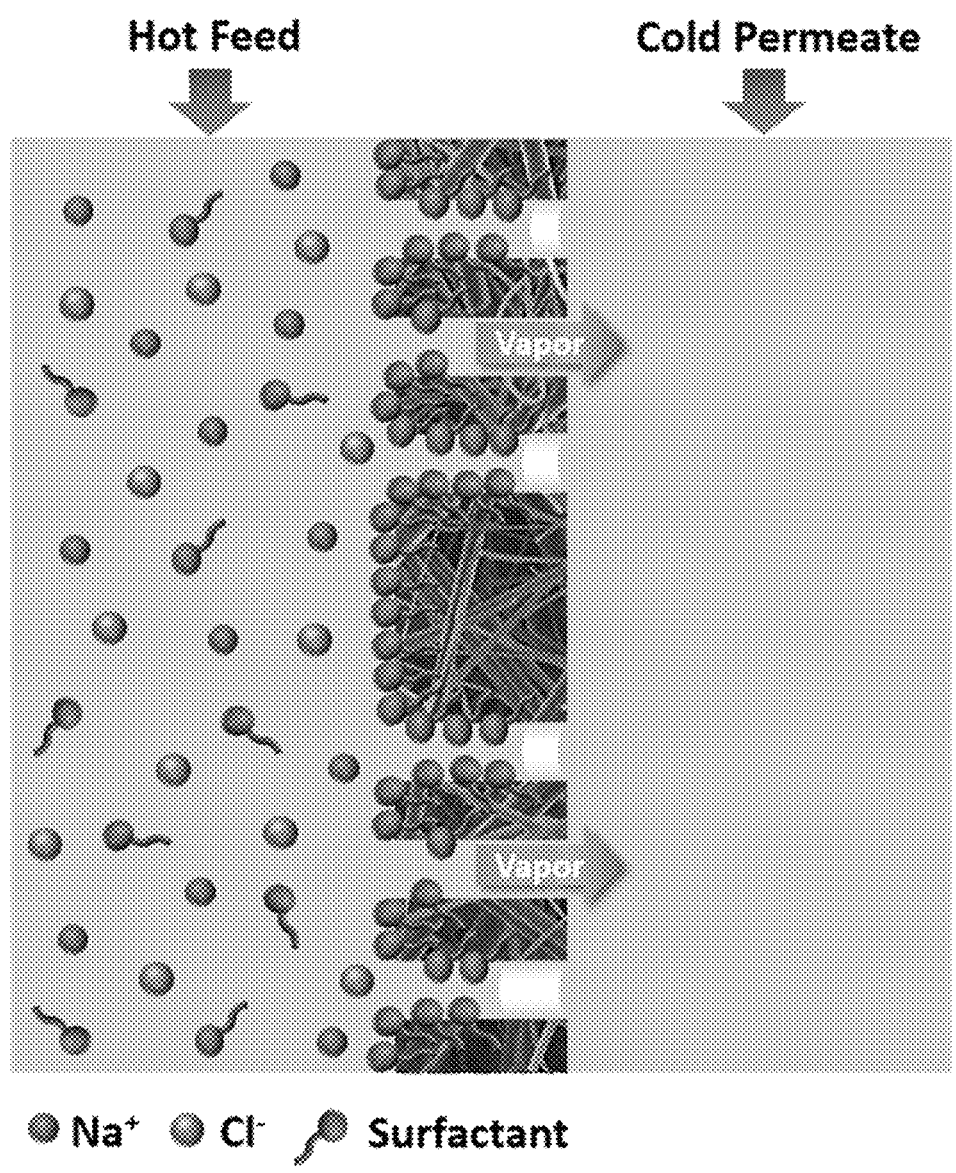
FIG. 8(a) shows membrane pores partially wetted by the SDS solution and FIG. 8(b) shows solution membrane pores untouched by the solution.
Figure 8B:
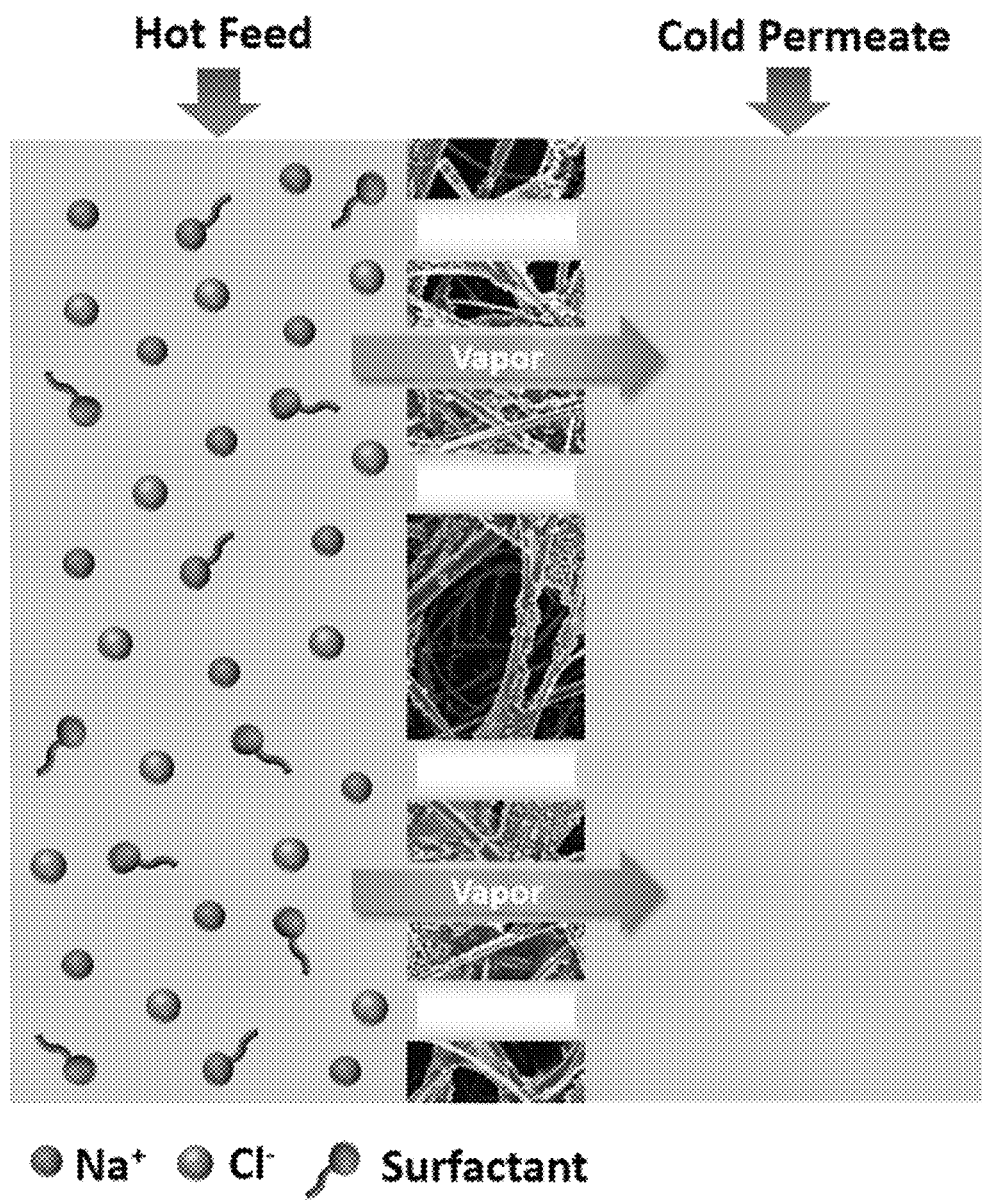

In FIG. 7(d), we tested the durability of the as-prepared OMNI membranes. The performance of the OMNI membranes with dosing 0.3 mM SDS concentration as initial feed maintains a stable water flux approximately 12 kg/m$^2$-h for long term continuous operation which indicates the resilience of the OMNI membrane toward the direct contact membrane distillation. Furthermore, the reusability of the OMNI membrane was also assessed for three-hour cycles, as shown in FIG. 7(e). The water flux of the omniphobic membrane attained the same water flux approximately 11.7 kg/m$^2$-h for each cycle, which demonstrates that it could be successfully regenerated. Thus, the omniphobic membrane with the effective deposition of ZnO nanoparticles is not only durable but also reusable as a membrane contactor for membrane distillation.

Accordingly, the present invention discloses a facile approach to fabricate the omniphobic (OMNI) membranes for membrane distillation with a low surface tension feed. ZnO nanoparticles were effectively deposited on a hydrophilic glass fiber (GF) membrane using a chemical bath deposition method, and the surface energy of the membrane was lowered by surface fluorination and the addition of a polymer coating. The SEM images showed that the presence of ZnO nanoparticles on the fiber structures created hierarchical re-entrant structures on the GF membrane. The XPS analyses further confirmed the successful surface fluorination and polymer coating on the OMNI membrane. The hierarchical re-entrant structures and modification of the low surface energy agents allowed the OMNI membrane to achieve omniphobic properties, as evidenced by the high contact angles for water (152.8±1.1°) and ethanol (110.3±1.9°). The DCMD experiments demonstrated that the OMNI membrane possessed the excellent wetting resistance and durability to the low surface tension feed solution, and the water flux was maintained for 8 h using a 0.3 mM SDS (60° C. 1 M NaCl) solution as initial feed. The above results demonstrate that the OMNI membrane is promising and feasible for desalinating low surface tension wastewaters.

What is claimed is:

1. An Omniphobic membrane, comprising a porous substrate which has a pore size between 0.4 and 2 μm, a top coat, and an interface layer between the porous substrate and the top coat, wherein the interface layer comprises a film and metal oxide, and wherein the metal oxides are deposited on the porous substrate and covered by the film;
wherein the omniphobic membrane has a carbon/silicon ratio between 40 and 60, provided by the film and a hierarchical re-entrant structure.

2. The omniphobic membrane of claim 1, wherein the porous substrate comprises glass fiber.

3. The omniphobic membrane of claim 1, wherein the top coat is a polymer which comprises Poly(vinylidene fluoride-co-hexafluoropropylene) (PVDF-HFP),Polytetrafluoroethylene (PTFE) or Poly(vinylidene fluoride) (PVDF).

4. The omniphobic membrane of claim 1, wherein the film is made of one which comprises 1H,1H,2H,2H-Perfluorodecyltriethoxysilane (FAS17) or polyhedral oligomeric silsesquioxane (POSS).

5. The omniphobic membrane of claim 1, wherein the metal oxides comprise zinc oxide.

6. The omniphobic membrane of claim 1, wherein a size of the metal oxides is between 200 and 400 nm.

7. The omniphobic membrane of claim 1, being a part of distillation equipment with salt rejection rate more than 94%, a part of air gap membrane distillation equipment or a part of sweeping gap membrane distillation equipment.

8. A process for fabricating an omniphobic membrane, comprising steps of
(1) Depositing a metal oxide on a porous substrate which has a pore size between 0.4 and 2 μm by a chemical bath deposition method;
(2) Coating a film on the metal oxide to form an organic-inorganic hybrid layer on the porous substrate; and
(3) Coating a polymer onto the organic-inorganic hybrid layer on the porous substrate to form the omniphobic membrane, wherein the omniphobic membrane has a carbon/silicon ratio between 40 and 60, and a hierarchical re-entrant structure wherein the film in step 2) provides said carbon/silicon ratio.

9. The process of claim 8, wherein the porous substrate comprises glass fiber.

10. The process of claim 8, wherein the coated polymer comprises Poly(vinylidene fluoride-co-hexafluoropropylene) (PVDF-HFP), Polytetrafluoroethylene (PTFE) or Poly(vinylidene fluoride) (PVDF).

11. The process of claim 8, wherein the film is made of one material which comprises 1H,1H,2H,2H-Perfluorodecyltriethoxysilane (FAS17) or polyhedral oligomeric silsesquioxane (POSS).

12. The process of claim 8, wherein the metal oxide comprises zinc oxide.

13. The process of claim 8, wherein a size of the metal oxide is between 200 and 400 nm.

14. A method for desalination of a liquid by membrane distillation, comprising steps of: providing a separation module comprises a plurality of omniphobic membrane; feeding a liquid into the separation module; and performing membrane distillation to have the liquid pass through the plurality of omniphobic membrane to desalinate the liquid, wherein the omniphobic membrane comprises a porous substrate which has a pore size between 0.4 and 2 μm, a top coat, and an interface layer between the porous substrate and the top coat, wherein the interface layer comprises a film and metal oxides which of the diameter is between 200 and 400 nm, and the metal oxides are deposited on the porous substrate and covered by the film, and the omniphobic membrane has a carbon/silicon ratio between 40 and 60, a hierarchical re-entrant structure, and a salt rejection rate more than 90%.

15. The method of claim 14, wherein the liquid comprises sea water, an alkaline halide aqueous solution and an aqueous solution which has a surface tension more than 30 mN/m.

16. The method of claim 14, wherein the porous substrate comprises glass fiber.

17. The method of claim 14, wherein the top coat is a polymer which comprises Poly(vinylidene fluoride-co-hexafluoropropylene) (PVDF-HFP), Polytetrafluoroethylene (PTFE) or Poly(vinylidene fluoride) (PVDF).

18. The method of claim 14, wherein the film is made of one material which comprises 1H,1H,2H,2H-Perfluorodecyltriethoxysilane (FAS17) or polyhedral oligomeric silsesquioxane (POSS).

19. The method of claim 14, wherein the metal oxides comprise zinc oxide.

* * * * *